US011251997B2

(12) United States Patent
Shi et al.

(10) Patent No.: US 11,251,997 B2
(45) Date of Patent: Feb. 15, 2022

(54) DATA TRANSMISSION METHOD AND DEVICE TO REDUCE COMPLEXITY OF INTERLEAVING MODULATION SYMBOLS

(71) Applicant: HUAWEI TECHNOLOGIES CO., LTD., Guangdong (CN)

(72) Inventors: Hongzhe Shi, Shanghai (CN); Shibin Ge, Shanghai (CN); Xiaoyan Bl, Shanghai (CN); Min Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 16/822,781

(22) Filed: Mar. 18, 2020

(65) Prior Publication Data

US 2020/0220752 A1     Jul. 9, 2020

Related U.S. Application Data

(63) Continuation of application No. PCT/CN2018/104205, filed on Sep. 5, 2018.

(30) Foreign Application Priority Data

Sep. 18, 2017    (CN) .......................... 201710841935.6

(51) Int. Cl.
    *H04W 76/27*       (2018.01)
    *H04L 27/00*       (2006.01)
        (Continued)

(52) U.S. Cl.
    CPC ........ *H04L 27/0008* (2013.01); *H04L 5/0051* (2013.01); *H04W 72/042* (2013.01);
        (Continued)

(58) Field of Classification Search
CPC ... H04W 80/02; H04W 76/27; H04W 72/042; H04W 72/0446; H04W 72/0453; H04L 1/00; H04L 27/0008; H04L 5/0051
See application file for complete search history.

(56) References Cited

U.S. PATENT DOCUMENTS

| 8,254,245 B2 | 8/2012 | Kim et al. | |
|---|---|---|---|
| 2013/0294318 A1* | 11/2013 | Amerga | ................ H04W 4/06 370/312 |

(Continued)

FOREIGN PATENT DOCUMENTS

| CN | 101330487 A | 12/2008 |
|---|---|---|
| CN | 102082600 A | 6/2011 |

(Continued)

OTHER PUBLICATIONS

Office Action issued in Chinese Application No. 201710841935.6 dated Mar. 1, 2021, 7 pages.

(Continued)

*Primary Examiner* — Wei Zhao
(74) *Attorney, Agent, or Firm* — Fish & Richardson P.C.

(57) ABSTRACT

This application provides a data transmission method and a device. The method includes: obtaining, by a transmit end device, a modulation symbol sequence in multiple time-frequency resource element groups, wherein a size of the time-frequency resource element group is agreed on in a protocol, or determined based on a transmission parameter; performing, by the transmit end device, interleaving processing on the modulation symbol sequence using the time-frequency resource element group as an interleaving unit, to obtain an order in which the modulation symbol sequence is mapped onto the multiple time-frequency resource element groups, wherein multiple consecutive modulation symbol groups in the modulation symbol sequence are mapped onto at least two of the multiple time-frequency resource element (Continued)

groups; and sending, by the transmit end device, the modulation symbol sequence in the order in which the modulation symbol sequence is mapped onto the multiple time-frequency resource element groups.

20 Claims, 24 Drawing Sheets

(51) Int. Cl.
H04L 5/00 (2006.01)
H04W 72/04 (2009.01)
H04W 80/02 (2009.01)

(52) U.S. Cl.
CPC ... *H04W 72/0446* (2013.01); *H04W 72/0453* (2013.01); *H04W 76/27* (2018.02); *H04W 80/02* (2013.01)

(56) References Cited

U.S. PATENT DOCUMENTS

| 2015/0131564 | A1 | 5/2015 | Seo et al. |
| 2015/0215904 | A1 | 7/2015 | Dai et al. |
| 2016/0127106 | A1 | 5/2016 | Nogami et al. |
| 2017/0230138 | A1* | 8/2017 | Xiong ............... H04W 72/0473 |
| 2017/0338906 | A1 | 11/2017 | Peng et al. |
| 2017/0366299 | A1 | 12/2017 | Li et al. |
| 2020/0119895 | A1* | 4/2020 | Choi ..................... H04W 76/27 |

FOREIGN PATENT DOCUMENTS

| CN | 102904665 A | 1/2013 |
| CN | 105656596 A | 6/2016 |
| CN | 105812107 A | 7/2016 |
| WO | 2015094816 A1 | 6/2015 |

OTHER PUBLICATIONS

Extended European Search Report issued in European Application No. 18855840.7 dated Aug. 12, 2020, 10 pages.
PCT International Search Report and Written Opinion in International Application No. PCT/CN2018/104,205, dated Nov. 29, 2018, 15 pages (With English Translation).
Huawei, "Introduction of uplink capacity enhancements in 36.212," 3GPP TSG RAN WG1 Meeting #88, R1-1704151, Athens, Greece, Feb. 13-17, 2017, 16 pages.
Office Action issued in Chinese Application No. 201710841935.6 dated Oct. 21, 2021, 5 pages.

* cited by examiner

CONT. FROM FIG. 7A

CONT. FROM FIG. 7A

| Time-frequency resource element group #2 | Time-frequency resource element #5 (modulation symbol group #17) | Time-frequency resource element #17 (modulation symbol group #19) | Time-frequency resource element group #5 |
| --- | --- | --- | --- |
| | Time-frequency resource element #6 (modulation symbol group #21) | Time-frequency resource element #18 (modulation symbol group #23) | |
| | Time-frequency resource element #7 (modulation symbol group #2) | Time-frequency resource element #19 (modulation symbol group #4) | |
| | Time-frequency resource element #8 (modulation symbol group #6) | Time-frequency resource element #20 (modulation symbol group #8) | |
| Time-frequency resource element group #3 | Time-frequency resource element #9 (modulation symbol group #10) | Time-frequency resource element #21 (modulation symbol group #12) | Time-frequency resource element group #6 |
| | Time-frequency resource element #10 (modulation symbol group #14) | Time-frequency resource element #22 (modulation symbol group #16) | |
| | Time-frequency resource element #11 (modulation symbol group #8) | Time-frequency resource element #23 (modulation symbol group #20) | |
| | Time-frequency resource element #12 (modulation symbol group #22) | Time-frequency resource element #24 (modulation symbol group #24) | |

Subcarrier number (low) ↑
Subcarrier number (high)

OFDM symbol #1    OFDM symbol #2

FIG. 7B

CONT. FROM
FIG. 12A

CONT. FROM
FIG. 12A

| | OFDM symbol #1 | OFDM symbol #2 | |
|---|---|---|---|
| Logical time-frequency resource element group #2 (logical time-frequency resource element #6 to logical time-frequency resource element #10) | Logical time-frequency resource element #6 (modulation symbol group #7) | Logical time-frequency resource element #16 (modulation symbol group #19) | Logical time-frequency resource element group #4 (logical time-frequency resource element #16 to logical time-frequency resource element #20) |
| | Logical time-frequency resource element #7 (modulation symbol group #12) | Logical time-frequency resource element #17 (modulation symbol group #5) | |
| | Time-frequency resource element #9 (RS) | Time-frequency resource element #21 (RS) | |
| | Logical time-frequency resource element #8 (modulation symbol group #17) | Logical time-frequency resource element #18 (modulation symbol group #10) | |
| | Logical time-frequency resource element #9 (modulation symbol group #3) | Logical time-frequency resource element #19 (modulation symbol group #15) | |
| | Logical time-frequency resource element #10 (modulation symbol group #8) | Logical time-frequency resource element #20 (modulation symbol group #20) | |

Subcarrier number (low)
↑
Subcarrier number (high)

FIG. 12B

DATA TRANSMISSION METHOD AND DEVICE TO REDUCE COMPLEXITY OF INTERLEAVING MODULATION SYMBOLS

CROSS-REFERENCE TO RELATED APPLICATIONS

This application is a continuation of International Application No. PCT/CN2018/104205, filed on Sep. 5, 2018, which claims priority to Chinese Patent Application No. 201710841935.6, filed on Sep. 18, 2017. The disclosures of the aforementioned applications are hereby incorporated by reference in their entireties.

TECHNICAL FIELD

This application relates to the communications field, and in particular, to a data transmission method and a device.

BACKGROUND

In a long term evolution (long term evolution, LTE), information bits are transmitted within a transmission time interval (transmission time interval, TTI) TTI at a physical layer by using a transport block (transport block, TB) as a unit. Steps such as cyclic redundancy check (cyclic redundancy check, CRC) bit addition, code block segmentation (code block segmentation), channel coding (channel coding), rate matching (rate matching), and symbol modulation (modulation) are performed on information bits of a TB. Finally, symbols obtained through modulation are mapped onto scheduled time-frequency resources.

To improve system performance and resist frequency domain selectivity or time domain selectivity, interleaving the symbols obtained through modulation is considered as a feasible method. However, currently, an existing method for interleaving the symbols obtained through modulation is relatively complex. Consequently, data demodulation performance is affected.

Therefore, how to reduce complexity of interleaving the modulation symbols becomes a problem that urgently needs to be resolved.

SUMMARY

This application provides a data transmission method and a device, to reduce complexity of interleaving modulation symbols.

According to a first aspect, a data transmission method is provided. The method includes:

obtaining, by a transmit end device, a to-be-transmitted modulation symbol sequence in a plurality of time-frequency resource element groups, where the time-frequency resource element group includes N time-frequency resource elements, N is an integer greater than or equal to 2, the time-frequency resource element includes at least one resource element RE, one time-frequency resource element is used to carry one modulation symbol group, one modulation symbol group includes at least one modulation symbol, and a size of the time-frequency resource element group is agreed on in a protocol, or a size of the time-frequency resource element group is determined based on a transmission parameter;

performing, by the transmit end device, interleaving processing on the modulation symbol sequence by using the time-frequency resource element group as an interleaving unit, to obtain an order in which the modulation symbol sequence is mapped onto the plurality of time-frequency resource element groups, where a plurality of consecutive modulation symbol groups in the modulation symbol sequence are mapped onto at least two of the plurality of time-frequency resource element groups; and sending, by the transmit end device, the modulation symbol sequence in the order in which the modulation symbol sequence is mapped onto the plurality of time-frequency resource element groups.

In this embodiment of this application, one or a limited quantity of specific sizes of the time-frequency resource element group can be determined by being agreed on in the protocol or based on the transmission parameter. Therefore, computational complexity during chip processing can be simplified, and a prior-art problem of high complexity caused by interleaving performed by using a code block (code block, CB) as a unit can be resolved.

In this embodiment of this application, the transmit end device may be a network device, or may be a terminal device. During uplink transmission, the transmit end device is a terminal device, and a receive end device is a network device. During downlink transmission, the transmit end device is a network device, and the receive end device is a terminal device.

In this embodiment of this application, the to-be-transmitted modulation symbol sequence may be a modulation symbol sequence of a layer. The modulation symbol sequence may be a modulation symbol sequence obtained after layer mapping, or may be a modulation symbol sequence obtained, before layer mapping, through grouping based on layer mapping before layer mapping. This embodiment of this application is not limited thereto. It should be understood that in this embodiment of this application, the time-frequency resource element corresponds to a minimum interleaving unit. To be specific, modulation symbols carried on a time-frequency resource element are consecutive modulation symbols in the modulation symbol sequence. For example, one time-frequency resource element includes two REs, and correspondingly, one modulation symbol group includes two modulation symbols. In this case, a modulation symbol group carried on the time-frequency resource element includes two modulation symbols, and the two modulation symbols carried on the two REs are two consecutive modulation symbols in the to-be-transmitted modulation symbol sequence after interleaving processing.

In this embodiment of this application, the size of the time-frequency resource element group may indicate a size of the interleaving unit. Specifically, after interleaving processing, modulation symbols carried on one interleaving unit, namely, one time-frequency resource element group, are inconsecutive modulation symbol groups in the to-be-transmitted modulation symbol sequence. For example, one time-frequency resource element group includes five time-frequency resource elements, and correspondingly, the time-frequency resource element group is configured to carry five modulation symbol groups. It is assumed that the to-be-transmitted modulation symbol sequence includes 24 consecutive modulation symbol sequence groups, namely, a modulation symbol group #1 to a modulation symbol group #24. After interleaving processing, the five modulation symbol groups carried on the time-frequency resource element group are inconsecutive modulation symbol groups. For example, the five modulation symbol groups are five completely inconsecutive modulation symbol groups, for example, the modulation symbol group #1, the modulation symbol group #5, the modulation symbol group #9, the modulation symbol group #13, and the modulation symbol group #18. Optionally, five modulation symbol groups carried on one interleaving unit may include partially consecutive modulation symbol groups, but the five modulation symbol groups are not completely consecutive. For example, the five modulation symbol groups include the modulation symbol group #1, the modulation symbol group #2, the modulation symbol group #8, the modulation symbol group 9, and the modulation symbol group #18.

It should be understood that the foregoing values are only examples, and are merely intended to help a person skilled in the art understand this embodiment of this application, but are not intended to limit this embodiment of this application to the specific values or the specific scenarios in the examples.

It should be understood that, in some implementations, the foregoing interleaving operation may be directly applied to a to-be-transmitted bit sequence. The bit sequence is a bit sequence of each layer that is obtained after code block concatenation and before modulation, to be specific, by grouping, based on layer mapping after modulation, bit sequences that are before modulation.

With reference to the first aspect, in some implementations of the first aspect, the plurality of time-frequency resource element groups include all or some frequency domain resources on at least one orthogonal frequency division multiplexing (orthogonal frequency division multiplexing, OFDM) symbol.

For example, the at least one OFDM symbol may be one OFDM symbol, two OFDM symbols, . . . , or 14 OFDM symbols. This embodiment of this application is not limited thereto. The frequency domain resource is a frequency domain resource within a scheduling bandwidth range. It should be understood that a frequency domain bandwidth on the OFDM symbol may be configured by a network device or preset in a system. This is not limited in this embodiment of this application. The frequency domain bandwidth on the OFMD symbol may include at least two subcarriers, for example, include 12 subcarriers, 24 subcarriers, or 36 subcarriers. This embodiment of this application is not limited thereto. For example, the frequency domain resource bandwidth on the OFDM symbol is 36 subcarriers. The plurality of time-frequency resource element groups may include all the frequency domain resources on the at least one OFDM symbol, to be specific, 36 subcarriers; or may include some frequency domain resources, for example, 24 subcarriers, 12 subcarriers, or 8 subcarriers. This embodiment of this application is not limited thereto.

In this embodiment of this application, the size of the time-frequency resource element group may be agreed on in the protocol. To be specific, the size of the interleaving unit is agreed on in the protocol. In this case, the transmit end device may perform interleaving processing based on the interleaving unit specified in the protocol, unlike the prior art in which a CB size is determined through calculation and then interleaving is performed. Similarly, a receive end may also directly perform de-interleaving processing based on the interleaving unit specified in the protocol. Therefore, in this embodiment of this application, interleaving complexity can be reduced, and system performance can be improved.

With reference to the first aspect, in some implementations of the first aspect, the size of the time-frequency resource element group is determined based on the transmission parameter, where the transmission parameter includes at least one of the following parameters: a scheduling bandwidth, a delay spread, and a moving speed of a terminal device.

Before the transmit end device performs interleaving processing on the modulation symbols in the plurality of time-frequency resource element groups in a first order in which the modulation symbol of the data transport block is mapped onto the plurality of time-frequency resource element groups, the method further includes:

determining, by the transmit end device based on a preset correspondence between the transmission parameter and the size of the time-frequency resource element group, a size of the time-frequency resource element group that corresponds to a current transmission parameter.

With reference to the first aspect, in some implementations of the first aspect, the size of the time-frequency resource element group is determined based on the transmission parameter, where the transmission parameter includes at least one of the following parameters: the scheduling bandwidth, the delay spread, and the moving speed of the terminal device.

The transmit end device is a network device, the receive end device is a terminal device, and before the performing, by the transmit end device, interleaving processing on the modulation symbol sequence, the method further includes:

determining, by the transmit end device, the size of the time-frequency resource element group based on the transmission parameter; and sending, by the transmit end device, interleaving indication information to the receive end device, where the interleaving indication information indicates the size of the time-frequency resource group.

Alternatively, the transmit end device is a terminal device, the receive end device is a network device, and before the performing, by the transmit end device, interleaving processing on the modulation symbol sequence, the method further includes:

receiving, by the transmit end device, interleaving indication information sent by the receive end device, where the interleaving indication information indicates the size of the time-frequency resource group.

Specifically, the network device determines the size of the time-frequency resource group based on the transmission parameter, and the network device sends the interleaving indication information to the terminal device by using signaling, where the interleaving indication information indicates the size of the time-frequency resource group.

Therefore, the network device may flexibly determine, based on the transmission parameter, the size of the time-frequency resource group that corresponds to the transmission parameter, and can determine different sizes of the time-frequency resource group based on different values of the parameter, to meet interleaving requirements in different scenarios.

With reference to the first aspect, in some implementations of the first aspect, the interleaving indication information is sent by using radio resource control RRC signaling, a media access control-control element MAC-CE, or downlink control information DCI.

With reference to the first aspect, in some implementations of the first aspect, the modulation symbol sequence includes a modulation symbol of a data transport block and a modulation symbol of a reference signal included in a scheduling resource corresponding to the data transport block, and the time-frequency resource element group is a physical time-frequency resource element group.

It should be understood that in this embodiment of this application, the physical time-frequency resource element may be used to carry the modulation symbol of the data transmission block, and may also be used to carry the modulation symbol of the reference signal.

In this embodiment of this application, when there is a reference signal, a relatively large interleaving unit may be used for interleaving. The relatively large interleaving unit is used, so that after interleaving, a location of the reference signal remains unchanged, and can be prevented from being affected. In addition, all OFDM symbols may be interleaved by using a same interleaving solution, so that implementation complexity is low.

With reference to the first aspect, in some implementations of the first aspect, the modulation symbol sequence includes only a modulation symbol of a data transport block, the time-frequency resource element group is a logical time-frequency resource element group, and the logical time-frequency resource element group includes a time-frequency resource element that is of a physical time-frequency resource and that is configured to carry only the modulation symbol of the data transport block, where the physical time-frequency resource includes the time-frequency resource element used to carry the modulation symbol of the data transport block and a time-frequency resource element used to carry a modulation symbol of a reference signal included in a scheduling resource corresponding to the data transport block.

Specifically, when there is a reference signal in a transmission resource, in this embodiment of this application, during interleaving, modulation symbols of the reference signal may not be interleaved. In this case, a modulation symbol sequence may not include the modulation symbol of the reference signal, but include only a modulation symbol of a data transport block. In this case, the plurality of time-frequency resource groups configured to carry the to-be-transmitted modulation symbol sequence are logical time-frequency resource element groups, and the logical time-frequency resource element group includes a time-frequency resource element that is of a physical time-frequency resource and that is configured to carry only the modulation symbol of the data transport block In this embodiment of this application, the reference signal is skipped, and modulation symbols of the data transport block are interleaved in the logical resource element group without being affected by the reference signal. In addition, because a base station and UE are very clear about a location of a pilot frequency, implementation complexity is low.

With reference to the first aspect, in some implementations of the first aspect, the modulation symbol sequence includes only a modulation symbol of a data transport block, and the time-frequency resource element group is a physical time-frequency resource element group.

In this embodiment of this application, when no reference signal is transmitted on a time-frequency resource, that is, when the to-be-transmitted modulation symbol sequence does not include a modulation symbol of a reference signal, a relatively small interleaving unit is used for interleaving. The relatively small interleaving unit is used, so that an interleaving depth can be increased, and a diversity gain can be increased.

Therefore, in this embodiment of this application, all OFDM symbols may be interleaved by using a same interleaving solution, and in this embodiment of this application, the relatively small interleaving unit is used, so that the interleaving depth can be increased, and the diversity gain can be increased.

With reference to the first aspect, in some implementations of the first aspect, the modulation symbol sequence includes a first modulation symbol sequence and a second modulation symbol sequence. The plurality of time-frequency resource element groups include a first time-frequency resource element group set and a second time-frequency resource element group set. The first time-frequency resource element group set is used to carry the first modulation symbol sequence. The second time-frequency resource element group set is used to carry the second modulation symbol sequence. The first time-frequency resource element group set includes at least two first time-frequency resource element groups. The first time-frequency resource element group includes $N_1$ first time-frequency resource elements, where $N_1$ is an integer greater than or equal to 2. The second time-frequency resource element group set includes at least two second time-frequency resource element groups. The second time-frequency resource element group includes $N_2$ second time-frequency resource elements, where $N_2$ is an integer greater than or equal to 2. One first time-frequency resource element is used to carry one first modulation symbol group. One second time-frequency resource element is used to carry one second modulation symbol group. A quantity of resource elements REs included in the first time-frequency resource element is different from that of resource elements REs included in the second time-frequency resource element.

The performing, by the transmit end device, interleaving processing on the modulation symbol sequence by using the time-frequency resource element group as an interleaving unit, to obtain an order in which the modulation symbol sequence is mapped onto the plurality of time-frequency resource element groups includes:

performing, by the transmit end device, interleaving processing on the first modulation symbol sequence by using the first time-frequency resource element group as an interleaving unit, and performing interleaving processing on the second modulation symbol sequence by using the second time-frequency resource element group as an interleaving unit, to obtain a first order in which the first modulation symbol sequence is mapped onto the first time-frequency resource element group set and a second order in which the second modulation symbol sequence is mapped onto the second time-frequency resource element group set, where a plurality of consecutive first modulation symbol groups in the first modulation symbol sequence are mapped onto the at least two first time-frequency resource element groups in the first time-frequency resource element group set, and a plurality of consecutive second modulation symbol groups in the second modulation symbol sequence are mapped onto the at least two second time-frequency resource element groups in the second time-frequency resource element group set.

In this embodiment of this application, when there is a reference signal, a relatively large interleaving unit such as the second time-frequency resource element may be used for a resource part that carries the reference signal, and a relatively small interleaving unit such as the first time-frequency resource element may be used for a resource part that does not carry the reference signal.

In this embodiment of this application, interleaving processing is separately performed independently on two modulation symbol sequences, to obtain the first order and the second order in which the two modulation symbol sequences are respectively mapped onto the first time-frequency resource element group set and the second time-frequency resource element group set. Therefore, in this embodiment of this application, sizes of two resource element groups are set, so that it can be ensured that a maximum interleaving depth is obtained as much as possible through interleaving performed under a premise that a reference signal is included. Because the base station and the UE are very clear about the location of the pilot frequency, implementation complexity is still quite low.

According to a second aspect, a data transmission method is provided. The method includes:

receiving, by a receive end device, modulation symbols transmitted by using a plurality of time-frequency resource element groups, where the modulation symbols are mapped onto the plurality of time-frequency resource element groups in an order obtained after interleaving processing is performed on a modulation symbol sequence by using the time-frequency resource element group as an interleaving unit, the time-frequency resource element group includes N time-frequency resource elements, N is an integer greater than or equal to 2, the time-frequency resource element includes at least one resource element RE, one time-frequency resource element is used to carry one modulation symbol group, one modulation symbol group includes at least one modulation symbol, and a size of the time-frequency resource element group is agreed on in a protocol, or a size of the time-frequency resource element group is determined based on a transmission parameter; and performing, by the receive end device by using the time-frequency resource element group as an interleaving unit, de-interleaving processing on the modulation symbols transmitted by using the plurality of time-frequency resource element groups, to obtain the modulation symbol sequence.

In this embodiment of this application, one or a limited quantity of specific sizes of the time-frequency resource element group can be determined by being agreed on in the protocol or based on the transmission parameter. Therefore, computational complexity during chip processing can be simplified, and a prior-art problem of high complexity caused by interleaving performed by using a CB as a unit can be resolved.

It should be understood that the data transmission method described from the perspective of the receive end device in the second aspect corresponds to the data transmission method described from the perspective of the transmit end device in the first aspect. Specifically, for features and effects from the perspective of the second aspect, refer to the descriptions in the first aspect. To avoid repetition, details are not described herein again.

With reference to the second aspect, in some implementations of the second aspect, the modulation symbol sequence includes a modulation symbol of a data transport block and a modulation symbol of a reference signal included in a scheduling resource corresponding to the data transport block, and the time-frequency resource element group is a physical time-frequency resource element group.

With reference to the second aspect, in some implementations of the second aspect, the modulation symbol sequence includes only a modulation symbol of a data transport block, the time-frequency resource element group is a logical time-frequency resource element group, and the logical time-frequency resource element group includes a time-frequency resource element that is of a physical time-frequency resource and that is configured to carry only the modulation symbol of the data transport block, where the physical time-frequency resource includes the time-frequency resource element used to carry the modulation symbol of the data transport block and a time-frequency resource element used to carry a modulation symbol of a reference signal included in a scheduling resource corresponding to the data transport block.

With reference to the second aspect, in some implementations of the second aspect, the modulation symbol sequence includes a first modulation symbol sequence and a second modulation symbol sequence, the plurality of time-frequency resource element groups include a first time-frequency resource element group set and a second time-frequency resource element group set, the first time-frequency resource element group set is used to carry the first modulation symbol sequence, the second time-frequency resource element group set is used to carry the second modulation symbol sequence, the first time-frequency resource element group set includes at least two first time-frequency resource element groups, the first time-frequency resource element group includes $N_1$ first time-frequency resource elements, $N_1$ is an integer greater than or equal to 2, the second time-frequency resource element group set includes at least two second time-frequency resource element groups, the second time-frequency resource element group includes $N_2$ second time-frequency resource elements, $N_2$ is an integer greater than or equal to 2, one first time-frequency resource element is used to carry one first modulation symbol group, and one second time-frequency resource element is used to carry one second modulation symbol group, where a quantity of resource elements REs included in the first time-frequency resource element is different from that of resource elements REs included in the second time-frequency resource element.

The performing, by the receive end device by using the time-frequency resource element group as an interleaving unit, de-interleaving processing on the modulation symbols transmitted by using the plurality of time-frequency resource element groups, to obtain the modulation symbol sequence includes:

performing, by the receive end device by using the first time-frequency resource element group as an interleaving unit, de-interleaving processing on modulation symbols carried on the first time-frequency resource element group set, and performing, by using the second time-frequency resource element group as an interleaving unit, de-interleaving processing on modulation symbols carried on the second time-frequency resource element group set, to obtain the first modulation symbol sequence and the second modulation symbol sequence.

With reference to the second aspect, in some implementations of the second aspect, the size of the time-frequency resource element group is determined based on the transmission parameter, where the transmission parameter includes at least one of the following parameters: a scheduling bandwidth, a delay spread, and a moving speed of a terminal device.

Before the performing, by the receive end device by using the time-frequency resource element group as an interleaving unit, de-interleaving processing on the modulation symbols transmitted by using the plurality of time-frequency resource element groups, the method further includes:

determining, by the receive end device based on a preset correspondence between the transmission parameter and the size of the time-frequency resource element group, a size of the time-frequency resource element group that corresponds to a current transmission parameter.

With reference to the second aspect, in some implementations of the second aspect, the size of the time-frequency resource element group is determined based on the transmission parameter, where the transmission parameter includes at least one of the following parameters: the scheduling bandwidth, the delay spread, and the moving speed of the terminal device.

When the receive end device is a network device, and the transmit end device is a terminal device, before the receiving, by a receive end device, modulation symbols transmitted by using a plurality of time-frequency resource element groups, the method further includes:

determining, by the receive end device, the size of the time-frequency resource element group based on the transmission parameter; and sending, by the receive end device, interleaving indication information to the transmit end device, where the interleaving indication information indicates the size of the time-frequency resource group.

Alternatively, the receive end device is a terminal device, the transmit end device is a network device, and before the performing, by the receive end device by using the time-frequency resource element group as an interleaving unit, de-interleaving processing on the modulation symbols transmitted by using the plurality of time-frequency resource element groups, the method further includes:

receiving, by the receive end device, interleaving indication information sent by the transmit end device, where the interleaving indication information indicates the size of the time-frequency resource group.

With reference to the second aspect, in some implementations of the second aspect, the interleaving indication information is sent by using radio resource control RRC signaling, a media access control-control element MAC-CE, or downlink control information DCI.

With reference to the second aspect, in some implementations of the second aspect, the plurality of time-frequency resource element groups include all or some frequency domain resources on at least one OFDM symbol.

According to a third aspect, an interleaving method is provided. The method includes:

generating, by a network device, interleaving indication information, where the interleaving indication information is used to indicate a size of an interleaving unit, and the interleaving unit is a time-frequency resource element group or a modulation symbol group; and sending, by the network device, the interleaving indication information.

With reference to the third aspect, in some implementations of the third aspect, before the generating, by a network device, interleaving indication information, the method further includes:

determining, by the network device, the size of the interleaving unit based on a transmission parameter, where the transmission parameter includes at least one of the following parameters: a scheduling bandwidth, a delay spread, and a moving speed of a terminal device.

With reference to the third aspect, in some implementations of the third aspect, the sending, by the network device, the interleaving indication information includes:

sending, by the network device, the interleaving indication information by using radio resource control RRC signaling, a media access control-control element MAC-CE, or downlink control information DCI.

Therefore, the network device may flexibly determine, based on the transmission parameter, a size of the time-frequency resource group that corresponds to the transmission parameter, and can determine different sizes of the time-frequency resource group based on different values of the parameter, to meet interleaving requirements in different scenarios, and a prior-art problem of high complexity caused by interleaving performed by using a CB as a unit can be resolved.

According to a fourth aspect, an interleaving method is provided. The method includes:

receiving, by a terminal device, interleaving indication information, where the interleaving indication information is used to indicate a size of an interleaving unit, and the interleaving unit is a time-frequency resource element group or a modulation symbol group; and determining, by the terminal device, a size of the time-frequency resource element group based on the interleaving indication information.

With reference to the fourth aspect, in some implementations of the fourth aspect, the receiving, by a terminal device, interleaving indication information includes:

receiving, by the terminal device, the interleaving indication information sent by a network device by using radio resource control RRC signaling, a media access control-control element MAC-CE, or downlink control information DCI.

Therefore, the network device may flexibly determine, based on a transmission parameter, a size of the time-frequency resource group that corresponds to the transmission parameter, and can determine different sizes of the time-frequency resource group based on different values of the parameter, to meet interleaving requirements in different scenarios, and a prior-art problem of high complexity caused by interleaving performed by using a CB as a unit can be resolved.

According to a fifth aspect, an interleaving method is provided. The method includes:

performing, by a transmit end device, interleaving processing on a to-be-sent modulation symbol sequence by using an interleaving unit, to obtain an interleaving result, where a size of the interleaving unit is agreed on in a protocol or is determined based on a transmission parameter, and the interleaving unit is a time-frequency resource element group or a modulation symbol group; and sending, by the transmit end device, the modulation symbol sequence based on the interleaving result.

In this embodiment of this application, one or a limited quantity of specific sizes of the time-frequency resource element group can be determined by being agreed on in the protocol or based on the transmission parameter. Therefore, computational complexity during chip processing can be simplified, and a prior-art problem of high complexity caused by interleaving performed by using a CB as a unit can be resolved.

According to a sixth aspect, an interleaving method is provided. The method includes:

receiving, by a receive end device, a modulation symbol, where the modulation symbol is mapped onto a time-frequency resource after interleaving processing is performed on a modulation symbol sequence based on an interleaving unit; and performing, by the receive end device, de-interleaving processing based on the interleaving unit, to obtain the modulation symbol sequence, where a size of the interleaving unit is agreed on in a protocol or is determined based on a transmission parameter, and the interleaving unit is a time-frequency resource element group or a modulation symbol group.

In this embodiment of this application, one or a limited quantity of specific sizes of the time-frequency resource element group can be determined by being agreed on in the protocol or based on the transmission parameter. Therefore, computational complexity during chip processing can be simplified, and a prior-art problem of high complexity caused by interleaving performed by using a CB as a unit can be resolved.

According to a seventh aspect, a transmit end device is provided. The transmit end device includes modules or units configured to perform the method according to any one of the first aspect or the possible implementations of the first aspect, or modules or units configured to perform the communication method according to any one of the fifth aspect or the possible implementations of the fifth aspect.

It should be understood that during uplink transmission, the transmit end device is a terminal device, and during downlink transmission, the transmit end device is a network device.

According to an eighth aspect, a receive end device is provided. The receive end device includes modules or units configured to perform the communication method according to any one of the second aspect or the possible implementations of the second aspect, or modules or units configured to perform the communication method according to any one of the sixth aspect or the possible implementations of the sixth aspect.

It should be understood that during uplink transmission, the receive end device is a network device, and during downlink transmission, the receive end device is a terminal device.

According to a ninth aspect, a network device is provided. The transmit end device includes modules or units configured to perform the method according to any one of the third aspect or the possible implementations of the third aspect.

According to a tenth aspect, a terminal device is provided. The receive end device includes modules or units configured to perform the communication method according to any one of the fourth aspect or the possible implementations of the fourth aspect.

According to an eleventh aspect, a terminal device is provided. The terminal device includes a transceiver, a processor, and a memory. The processor is configured to control the transceiver to send and receive signals, the memory is configured to store a computer program, and the processor is configured to invoke the computer program from the memory and run the computer program, so that the terminal device performs the method, performed by the terminal device, in the first aspect to the sixth aspect and the possible implementations of the first aspect to the sixth aspect.

According to a twelfth aspect, a network device is provided. The network device includes a transceiver, a processor, and a memory. The processor is configured to control the transceiver to send and receive signals, the memory is configured to store a computer program, and the processor is configured to invoke the computer program from the memory and run the computer program, so that the network device performs the method, performed by the network device, in the first aspect to the sixth aspect and the possible implementations of the first aspect to the sixth aspect.

In a possible design, the network device may be implemented by using a chip.

In a possible design, the terminal device may be implemented by using a chip.

According to a thirteenth aspect, a computer program product is provided. The computer program product includes a computer program (also referred to as code or an instruction). When the computer program is run, a computer is enabled to perform the method according to any one of the first aspect to the sixth aspect or the possible implementations of the first aspect to the sixth aspect.

According to a fourteenth aspect, a computer readable medium is provided. The computer readable medium stores a computer program (also referred to as code or an instruction). When the computer program is run on a computer, the computer is enabled to perform the method according to any one of the first aspect to the sixth aspect or the possible implementations of the first aspect to the sixth aspect.

BRIEF DESCRIPTION OF DRAWINGS

FIG. 7A and FIG. 7B are a schematic diagram of interleaving according to another embodiment of this application;

FIG. 12A and FIG. 12B are a schematic diagram of interleaving according to another embodiment of this application;

DESCRIPTION OF EMBODIMENTS

The following describes technical solutions of this application with reference to accompanying drawings.

The technical solutions of embodiments of this application may be applied to various communications systems, such as a global system for mobile communications (global system of mobile communication. GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunications system (universal mobile telecommunication system, UMTS), a worldwide interoperability for microwave access (worldwide interoperability for microwave access, WiMAX) communications system, a future 5G system, or new radio (new radio, NR).

Figure 1:
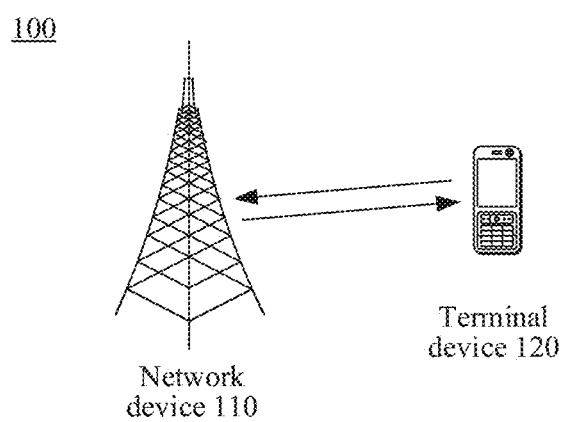
FIG. 1 is a schematic scenario diagram of a system to which embodiments of this application may be applied.

FIG. 1 shows a communications system 100 to which the embodiments of this application are applied. The communications system 100 may be any one of the foregoing communications systems. The communications system 100 may include at least one network device 110 and at least one terminal device 120. Each network device 1100 may provide communication coverage for a particular geographic area, and may communicate with the terminal device 120 (for example, UE) located in the coverage area (a cell).

The terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

The network device in the embodiments of this application may be a device configured to communicate with the terminal device. The network device may be a base transceiver station (base transceiver station, BTS) in the global system for mobile communications (global system of mobile communication, GSM) system or code division multiple access (code division multiple access, CDMA), or may be a NodeB (node B. NB) in the WCDMA system, or may be an evolved NodeB (evolutional node B, eNB or eNodeB) in the LTE system, or a radio controller in a cloud radio access network (cloud radio access network, CRAN). Alternatively, the network device may be a relay node, an access point, a vehicle-mounted device, a wearable device, a network-side device in the future 5G network, a network device in the future evolved public land mobile network (public land mobile network, PLMN), or the like.

Figure 2:
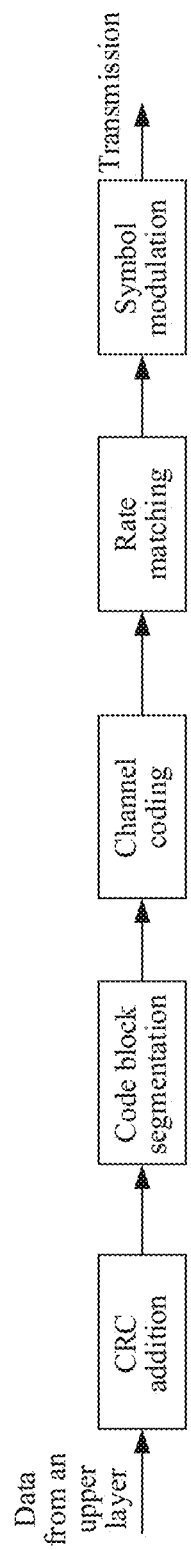
FIG. 2 is a schematic diagram of a data processing process according to an embodiment of this application.

FIG. 2 shows main steps of a data processing process performed before data is sent by using an OFDM symbol. For other steps, refer to existing documents. As shown in FIG. 2, steps such as CRC addition, code block segmentation, channel coding, rate matching, and symbol modulation are performed on data from an upper layer (for example, a MAC layer) undergoes, and finally modulated symbols are mapped onto a time-frequency resource for sending.

OFDM transmission is multi-carrier transmission, and in the OFDM transmission, each modulation signal is limited to relatively narrow bandwidth. Therefore, when the OFDM transmission experiences a frequency selective channel condition, some modulation signals are completely in a frequency band with quite low instantaneous signal strength. If these signals all belong to a same decoding unit, bit errors of the signals may be beyond an error correction capability of forward error correcting code (forward error correction, FEC). Consequently, an entire transport block cannot be correctly received. To improve system performance and resist frequency domain selectivity or time domain selectivity, interleaving the symbols obtained through modulation is considered as a feasible method.

In an existing discussion, modulation symbols are usually interleaved by using a code block (CB) as a unit. For example, modulation symbols generated through modulation are first mapped onto a layer, then mapped onto a frequency domain, finally mapped onto a time domain, and interleaved in the mapping process, so that an effect of decentralized distribution of data of a same CB in frequency domain is achieved. In addition, data of one CB may be centralized on a time-domain symbol or consecutive time-domain symbols. This helps a receive end perform fast demodulation.

Figure 3:
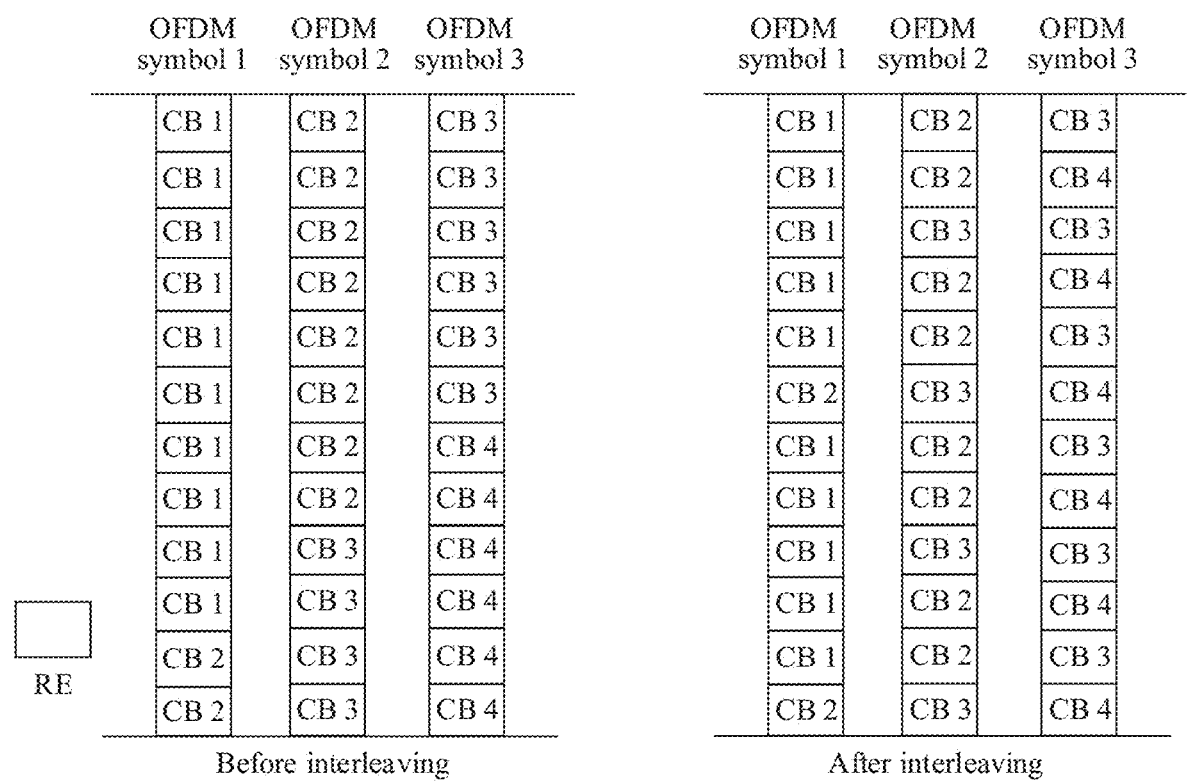
FIG. 3 is a schematic diagram of interleaving performed by using a CB as an interleaving unit according to an embodiment of this application.

For example, as shown in FIG. 3, it is assumed that one CB includes 10 modulation symbols. As shown in FIG. 3, a distribution case of modulation symbols of CBs in the three OFDM symbols before interleaving is that the first 10 REs in an OFDM symbol 1 correspond to a CB 1, the last two REs correspond to a CB 2, and so on. In a scenario to which fast demodulation is applied, it is assumed that an interleaving range is in each OFDM symbol. As shown in FIG. 3, the first five REs and the seventh to the eleventh REs in the interleaved OFDM symbol 1 correspond to the CB 1, the sixth RE and the twelfth RE correspond to the CB 2, and so on. It can be learned from FIG. 3 that after interleaving, quantity proportions of REs from different code blocks in different OFDM symbols are different, so that after interleaving, patterns of resource mapping in the different OFDM symbols are different. Consequently, implementation complexity is relatively high. In addition, the proportion relationship has no definite laws to follow, and may constantly change on the different OFDM symbols as a scheduling bandwidth changes and a size of a transport block changes. Therefore, CB-based interleaving is relatively complex for chip implementation.

In view of the foregoing problem, the embodiments of this application skillfully provide an interleaving method, so that all OFDM symbols use one or two same interleaving solutions, to reduce interleaving complexity and improve system performance.

For ease of understanding and description, in an example rather than a limitation, the following describes an execution process and actions of a data transmission method in the communications system in this application in detail.

Figure 4:
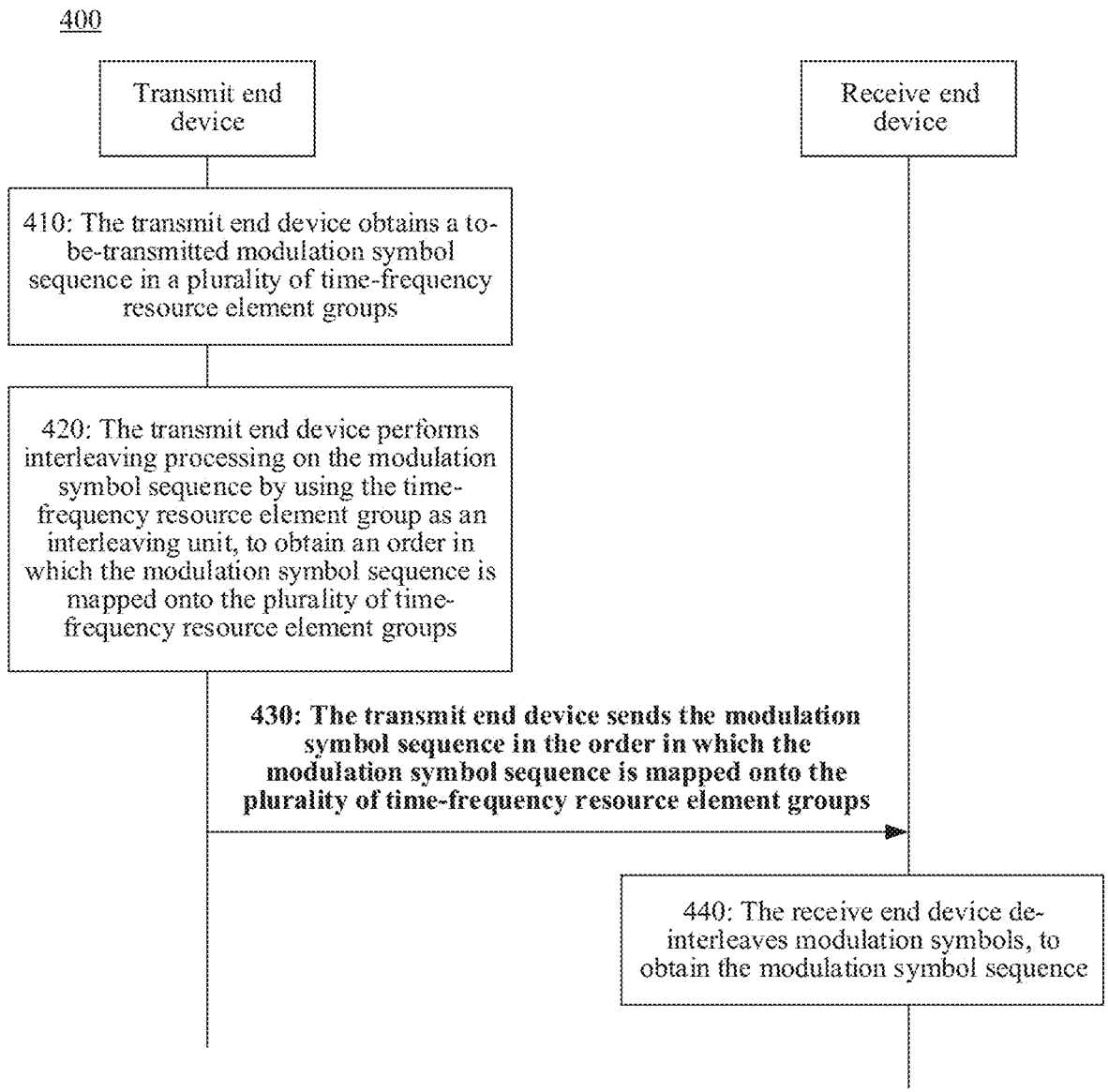
FIG. 4 is a schematic flowchart of a data transmission method according to an embodiment of this application.

FIG. 4 is a schematic flowchart of a data interleaving method according to an embodiment of this application from the perspective of device interaction. The method shown in FIG. 4 includes the following steps.

410: A transmit end device obtains a to-be-transmitted modulation symbol sequence in a plurality of time-frequency resource element groups.

The time-frequency resource element group includes N time-frequency resource elements. N is an integer greater than or equal to 2, the time-frequency resource element includes at least one resource element (resource element, RE), one time-frequency resource element is used to carry one modulation symbol group, one modulation symbol group includes at least one modulation symbol, and a size of the time-frequency resource element group is agreed on in a protocol, or a size of the time-frequency resource element group is determined based on a transmission parameter.

In this embodiment of this application, the transmit end device may be a network device, or may be a terminal device. During uplink transmission, the transmit end device is a terminal device, and a receive end device is a network device. During downlink transmission, the transmit end device is a network device, and the receive end device is a terminal device.

In this embodiment of this application, the to-be-transmitted modulation symbol sequence may be a modulation symbol sequence of a layer. The modulation symbol sequence may be a modulation symbol sequence obtained after layer mapping, or may be a modulation symbol sequence obtained, before layer mapping, through grouping based on layer mapping. This embodiment of this application is not limited thereto.

It should be understood that in this embodiment of this application, the time-frequency resource element corresponds to a minimum interleaving unit. To be specific, modulation symbols carried on one time-frequency resource element are consecutive modulation symbols in the modulation symbol sequence. For example, one time-frequency resource element includes two REs, and correspondingly, one modulation symbol group includes two modulation symbols. In this case, a modulation symbol group carried on the time-frequency resource element includes two modulation symbols, and the two modulation symbols carried on the two REs are two consecutive modulation symbols in the to-be-transmitted modulation symbol sequence after interleaving processing.

In this embodiment of this application, the size of the time-frequency resource element group may indicate a size of the interleaving unit. Specifically, after interleaving processing, modulation symbols carried on one interleaving unit, namely, one time-frequency resource element group, are inconsecutive modulation symbol groups in the to-be-transmitted modulation symbol sequence. For example, one time-frequency resource element group includes five time-frequency resource elements, and correspondingly, the time-frequency resource element group is configured to carry five modulation symbol groups. It is assumed that the to-be-transmitted modulation symbol sequence includes 24 consecutive modulation symbol sequence groups, namely, a modulation symbol group #1 to a modulation symbol group #24. After interleaving processing, the five modulation symbol groups carried on the time-frequency resource element group are inconsecutive modulation symbol groups. For example, the five modulation symbol groups are five completely inconsecutive modulation symbol groups, for example, the modulation symbol group #1, the modulation symbol group #5, the modulation symbol group #9, the modulation symbol group #13, and the modulation symbol group #18. Optionally, five modulation symbol groups carried on one interleaving unit may include partially consecutive modulation symbol groups, but the five modulation symbol groups are not completely consecutive. For example, the five modulation symbol groups include the modulation symbol group #1, the modulation symbol group #2, the modulation symbol group #8, the modulation symbol group 9, and the modulation symbol group #18.

It should be understood that the foregoing values are only examples, and are merely intended to help a person skilled in the art understand this embodiment of this application, but are not intended to limit this embodiment of this application to the specific values or the specific scenarios in the examples.

It should be understood that in this embodiment of this application, the plurality of time-frequency resource element groups may include all or some frequency domain resources on at least one OFDM symbol. For example, the at least one OFDM symbol may be one OFDM symbol, two OFDM symbols, . . . , or 14 OFDM symbols. This embodiment of this application is not limited thereto. The frequency domain resource is a frequency domain resource within a scheduling bandwidth range. It should be understood that a frequency domain bandwidth on the OFDM symbol may be configured by a network device or preset in a system. This is not limited in this embodiment of this application. The frequency domain bandwidth on the OFMD symbol may include at least two subcarriers, for example, include 12 subcarriers, 24 subcarriers, or 36 subcarriers. This embodiment of this application is not limited thereto. For example, the frequency domain resource bandwidth on the OFDM symbol is 36 subcarriers. The plurality of time-frequency resource element groups may include all frequency domain resources on the at least one OFDM symbol, to be specific, 36 subcarriers; or may include some frequency domain resources, for example, 24 subcarriers, 12 subcarriers, or 8 subcarriers. This embodiment of this application is not limited thereto.

Figure 5:
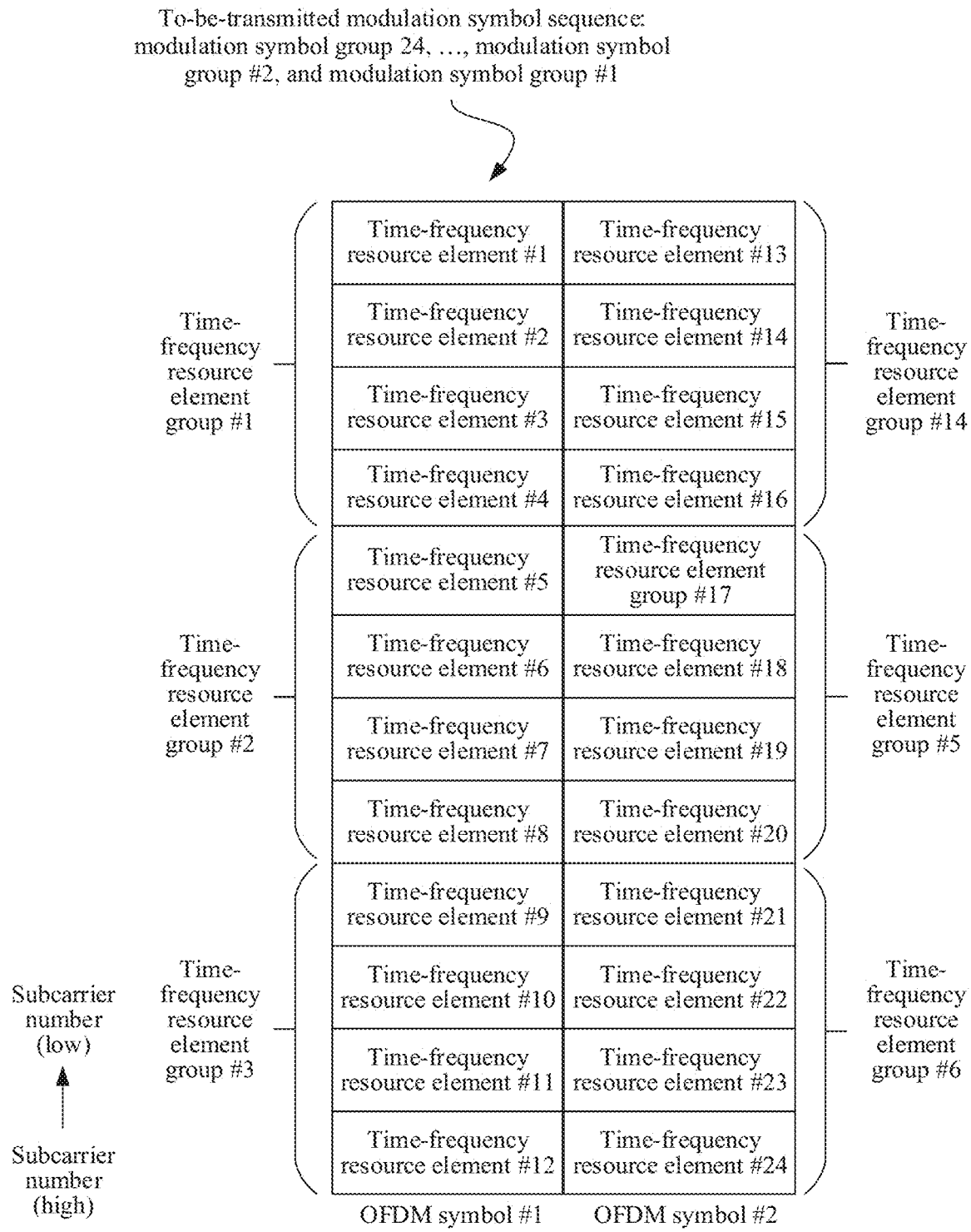
FIG. 5 is a schematic diagram of a plurality of time-frequency resource element groups according to an embodiment of this application.

For example, as shown in FIG. 5, a plurality of time-frequency resource elements include all frequency domain resources, for example, 12 subcarriers, on two OFDM symbols, namely, an OFDM symbol #1 and an OFDM symbol #2. One resource element includes one RE, one modulation symbol group includes one modulation symbol, and one time-frequency resource element group includes four time-frequency resource elements (to be specific, N=4). Therefore, as shown in FIG. 5, the plurality of time-frequency resource element groups include six time-frequency resource element groups in total, namely, a time-frequency resource element group #1 to a time-frequency resource element group #6, in other words, 24 time-frequency resource elements (that is, 24 REs) in total. In an order of first subcarriers and then OFDM symbols, the 24 REs are sequentially a resource element #1, a resource element #2, . . . , and a resource element #24. Correspondingly, the modulation symbol sequence includes 24 modulation symbol groups, to be specific, a modulation symbol group #1, a modulation symbol group #2, . . . , and a modulation symbol group #24.

It should be understood that, when transmission is performed without interleaving, the modulation symbol sequence, to be specific, the modulation symbol group #1 to the modulation symbol group #24, may be respectively carried by using the time-frequency resource element #1 to the time-frequency resource element #24.

In this embodiment of this application, the size of the time-frequency resource element group may be agreed on in the protocol. To be specific, the size of the interleaving unit is agreed on in the protocol. In this case, the transmit end device may perform interleaving processing based on the interleaving unit specified in the protocol, unlike the prior art in which a CB size is determined through calculation and then interleaving is performed. Similarly, a receive end may also directly perform de-interleaving processing based on the interleaving unit specified in the protocol. Therefore, in this embodiment of this application, interleaving complexity can be reduced, and system performance can be improved.

It should be understood that during actual application, a same size of time-frequency resource element groups may be agreed on for all service types in the protocol, or different sizes of the time-frequency resource element groups may be agreed on for different service types in the protocol. This is not limited in this embodiment of this application.

Optionally, in an embodiment, the size of the time-frequency resource element group may be determined based on the transmission parameter. The transmission parameter includes at least one of the following parameters: a scheduling bandwidth, a delay spread, and a moving speed of a terminal device.

In this embodiment of this application, the size of the time-frequency resource element group may be determined based on the transmission parameter in a plurality of manners. The following uses examples for description.

Manner 1:

Both the transmit end device and the receive end device pre-store a correspondence between a plurality of values of the transmission parameter and a plurality of sizes of the time-frequency resource element group. For example, if the transmission parameter is a bandwidth, the correspondence may be shown in Table 1.

The transmit end device and the receive end device may determine, based on the preset correspondence, a size of the time-frequency resource element group that corresponds to a current transmission parameter. For example, when the transmission parameter is a scheduling bandwidth, the transmit end device and the receive end device may determine, by looking up Table 1 based on a current value of the scheduling bandwidth, for example, a second scheduling bandwidth, that the size of the time-frequency resource group is a second size of the time-frequency resource group.

It should be understood that Table 1 shows a one-to-one correspondence between the transmission parameters and the time-frequency resource groups. However, this embodiment of this application is not limited thereto. During actual application, the plurality of values of the transmission parameter may correspond to a same size of the time-frequency resource group.

TABLE 1

| Value of a scheduling bandwidth | Size of a time-frequency resource group |
|---|---|
| First scheduling bandwidth | First size of the time-frequency resource group |
| Second scheduling bandwidth | Second size of the time-frequency resource group |
| ... | ... |

Manner 2:

The network device determines the size of the time-frequency resource group based on the transmission parameter, and the network device sends interleaving indication information to the terminal device by using signaling, where the interleaving indication information indicates the size of the time-frequency resource group.

Therefore, the network device may flexibly determine, based on the transmission parameter, the size of the time-frequency resource group that corresponds to the transmission parameter, and can determine different sizes of the time-frequency resource group based on different values of the parameter, to meet interleaving requirements in different scenarios.

The time-frequency resource element group has only one or a limited quantity of specific sizes regardless of being agreed on in the protocol or being determined based on the transmission parameter. Therefore, computational complexity during chip processing is greatly simplified, and a prior-art problem of high complexity caused by interleaving performed by using a CB as a unit is resolved.

Optionally, the signaling may be radio resource control RRC signaling, a media access control-control element MAC-CE, downlink control information DCI, or the like. This embodiment of this application is not limited thereto.

In the two manners described above, it can be learned that in the first manner, the network device does not need to send additional signaling to the terminal to indicate the size of the time-frequency resource group. Therefore, signaling overheads can be reduced in the first manner. In the second manner, neither a receive end nor a transmit end needs to pre-store the correspondence. Therefore, in the second manner, space occupied by pre-stored data in a device can be reduced.

420: The transmit end device performs interleaving processing on the modulation symbol sequence by using the time-frequency resource element group as an interleaving unit, to obtain an order in which the modulation symbol sequence is mapped onto the plurality of time-frequency resource element groups.

N consecutive modulation symbol groups in the modulation symbol sequence are mapped onto at least two of the plurality of time-frequency resource element groups.

It should be understood that in this embodiment of this application, the interleaving processing may be performed in a plurality of manners, provided that after the interleaving processing, a plurality of (referred to as M below: where M is an integer greater than or equal to 2) consecutive modulation symbol groups in the modulation symbol sequence are mapped onto at least two of the plurality of time-frequency resource element groups. To be specific, after the interleaving processing, modulation symbol groups on one interleaving unit, namely, one time-frequency resource element group, are inconsecutive modulation symbol groups in the to-be-transmitted modulation symbol sequence. This is not specifically limited in this embodiment of this application.

It should be understood that a value of M is not limited in this embodiment of this application, provided that the value of M is greater than or equal to 2. In different interleaving manners, a value range of M may be different. For example, M=2, 3, 4, 5, 6, or the like. Particularly, M may be equal to N, or M may be equal to Z/N, where Z represents a total quantity of modulation symbol groups in the modulation symbol sequence. This embodiment of this application is not limited thereto.

Figure 6A:
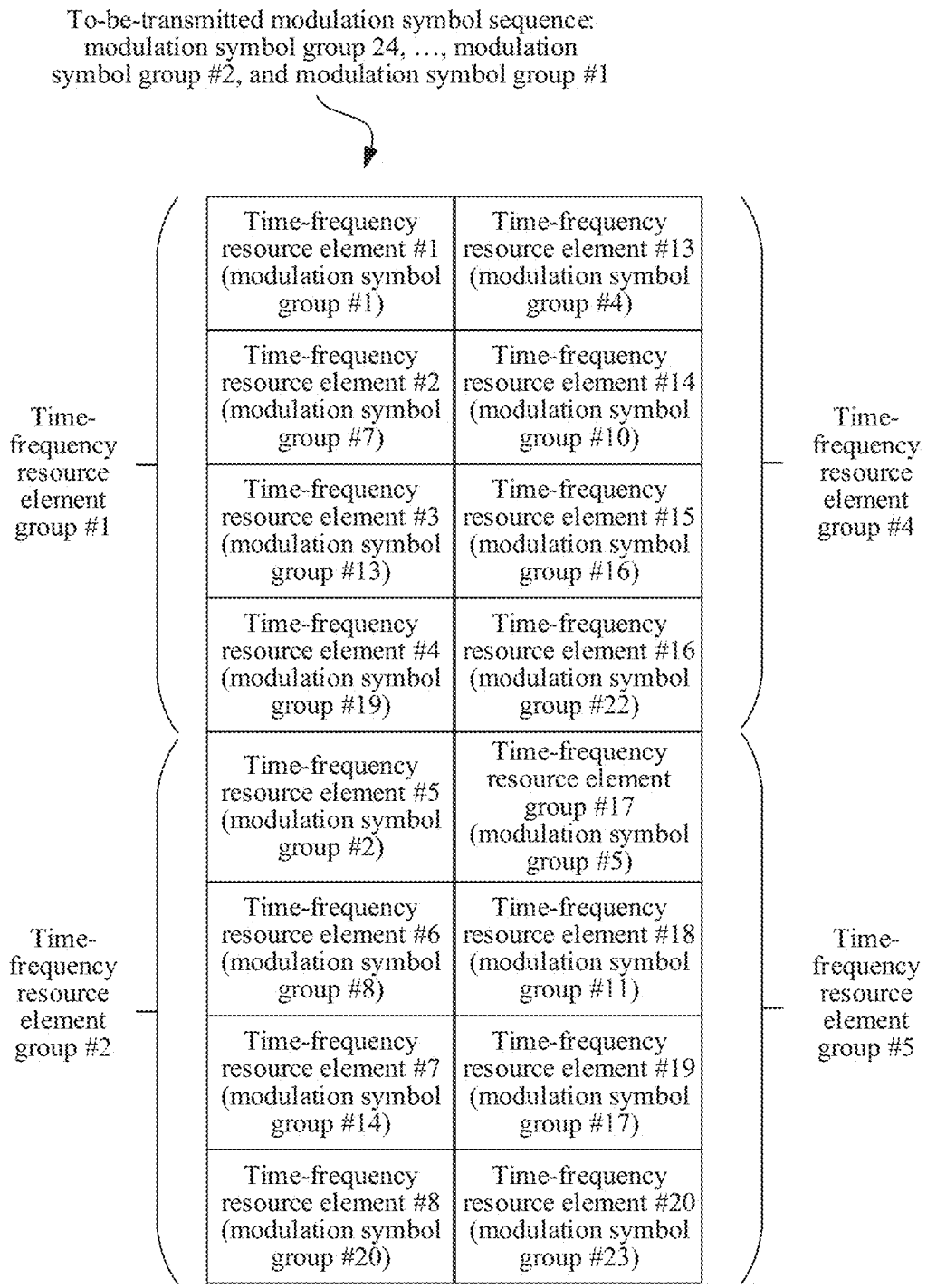
FIG. 6A and FIG. 6B are a schematic diagram of interleaving according to an embodiment of this application.
Figure 6B:
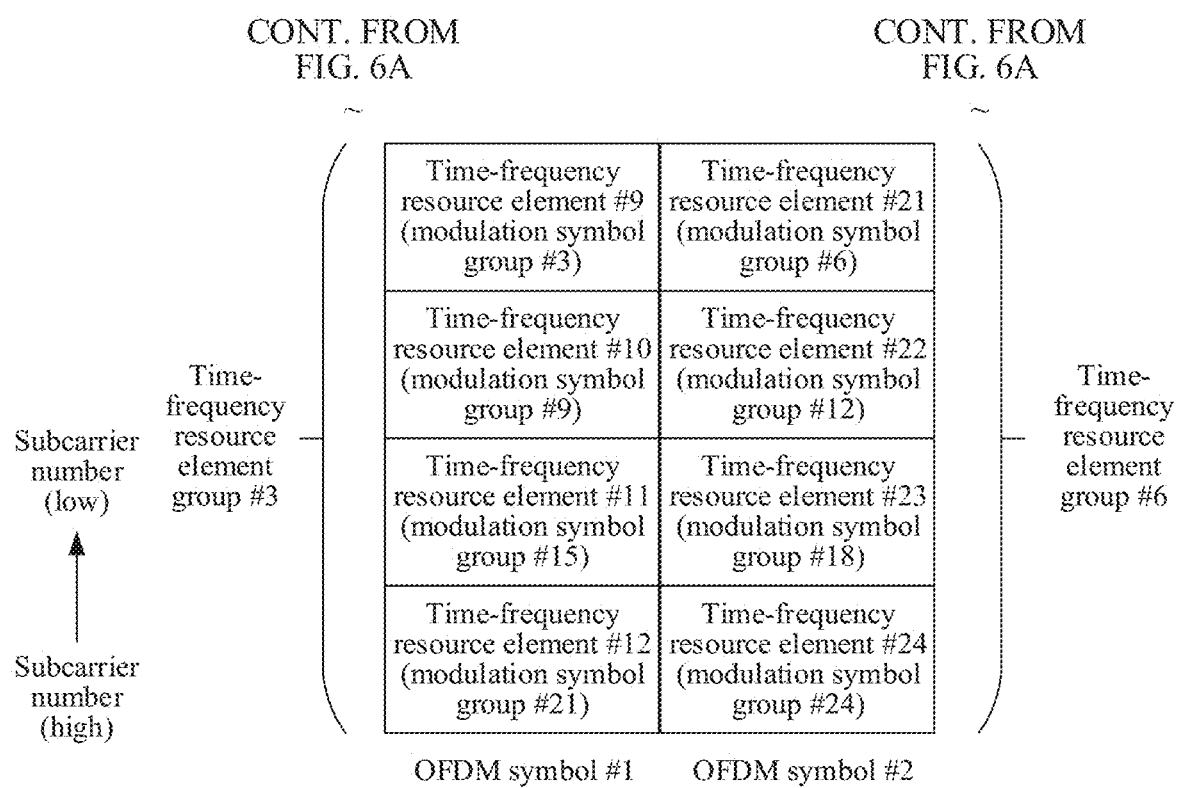

For example, FIG. 6A and FIG. 6B show a result of interleaving the corresponding modulation symbol sequence in FIG. 5 in one manner. Specifically, N=4, and an interleaving processing manner shown in FIG. 6A and FIG. 6B is mapping the modulation symbol sequence sequentially onto the first time-frequency resource elements (namely, the first REs) in the resource element group #1 to the resource element group #6, the second time-frequency resource elements in the resource element group #1 to the resource element group #6, the third time-frequency resource elements in the resource element group #1 to the resource element group #6, and the fourth time-frequency resource elements in the resource element group #1 to the resource element group #6 from the modulation symbol group #1 to the modulation symbol group #24. Specifically, the result obtained after the interleaving processing is shown in FIG. 6A and FIG. 6B.

Specifically, Table 2 shows an order in which the modulation symbols are mapped onto the plurality of time-frequency resource element groups after interleaving processing is performed on the modulation symbol sequence in FIG. 6A and FIG. 6B. It can be learned from Table 2, FIG. 6A, and FIG. 6B that six consecutive modulation symbol groups (corresponding to M=6=Z/N) in the modulation symbol sequence are mapped onto the six time-frequency resource element groups in the plurality of time-frequency resource element groups. For example, six consecutive modulation symbol groups, namely, the modulation symbol group #1 to the modulation symbol group #6 are respectively mapped onto the time-frequency resource element group #1 to the time-frequency resource element group #6.

TABLE 2

| Number of a modulation symbol group (modulation symbol) in a modulation symbol sequence | Number of a time-frequency resource element group | Number of a time-frequency resource element (RE) | Number of the modulation symbol group (modulation symbol) that is in the modulation symbol sequence and that is mapped onto the time-frequency resource element (RE) |
|---|---|---|---|
| 1 | 1 | 1 | 1 |
| 2 |   | 2 | 7 |
| 3 |   | 3 | 13 |
| 4 |   | 4 | 19 |
| 5 | 2 | 5 | 2 |
| 6 |   | 6 | 8 |
| 7 |   | 7 | 14 |
| 8 |   | 8 | 23 |
| 9 | ... | 9 | 3 |
| ... |   | ... | ... |
| 24 |   | 24 | 24 |

Figure 7A:
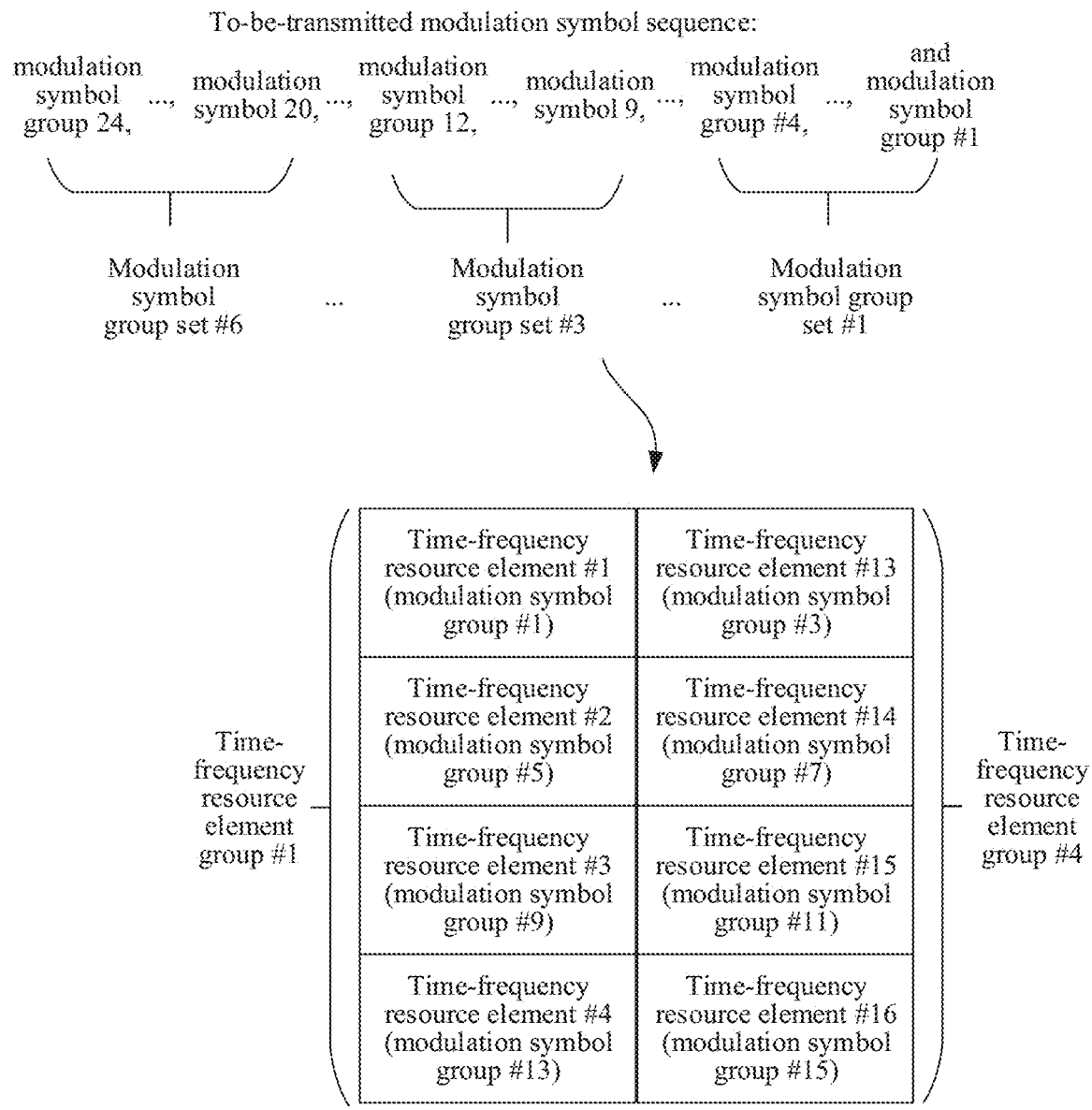

For another example, FIG. 7A and FIG. 7B show a result of interleaving the corresponding modulation symbol sequence in FIG. 5 in another manner. Specifically, N=4, and an interleaving processing manner shown in FIG. 7A and FIG. 7B is sequentially dividing, from the modulation symbol group #1 to the modulation symbol group #24, the modulation symbol sequence into six group sets by using N modulation symbol groups as a group set, to be specific, the modulation symbol group #1 to the modulation symbol group #4 are a group set #1, the modulation symbol group #5 to the modulation symbol 8 are a group set #2, ..., then sequentially selecting the first modulation symbol group in each group set, the second modulation symbol group in each group, ..., and the fourth modulation symbol group in each group from the group set #1 to a group set #6, and sequentially mapping the modulation symbol groups onto the time-frequency resource element #1 to the time-frequency resource element #24 in the selection order. Specifically, the result obtained after the interleaving processing is shown in FIG. 7A and FIG. 7B.

Specifically, Table 3 shows an order in which the modulation symbols are mapped onto the plurality of time-frequency resource element groups after interleaving processing is performed on the modulation symbol sequence in FIG. 7A and FIG. 7B. It can be learned from Table 3, FIG. 7A, and FIG. 7B that four consecutive modulation symbol groups (corresponding to M=N=4) in the modulation symbol sequence are mapped onto four of the plurality of time-frequency resource element groups. For example, four consecutive modulation symbol groups, namely, the modulation symbol group #1 to the modulation symbol group #4 are respectively mapped onto the time-frequency resource element group #1, the time-frequency resource element group #2, the time-frequency resource element group #4, and the time-frequency resource element group #5.

TABLE 3

| Number of a modulation symbol group (modulation symbol) in a modulation symbol sequence | Number of modulation symbol group set | Number of a time-frequency resource element group | Number of a time-frequency resource element (RE) | Number of the modulation symbol group (modulation symbol) that is in the modulation symbol sequence and that is mapped onto the time-frequency resource element (RE) |
|---|---|---|---|---|
| 1 | 1 | 1 | 1 | 1 |
| 2 |   |   | 2 | 5 |
| 3 |   |   | 3 | 9 |
| 4 |   |   | 4 | 13 |
| 5 | 2 | 2 | 5 | 17 |
| 6 |   |   | 6 | 21 |
| 7 |   |   | 7 | 2 |
| 8 |   |   | 8 | 6 |
| 9 | ... | ... | 9 | 10 |
| ... |   |   | ... | ... |
| 24 |   |   | 24 | 24 |

Figure 8A:
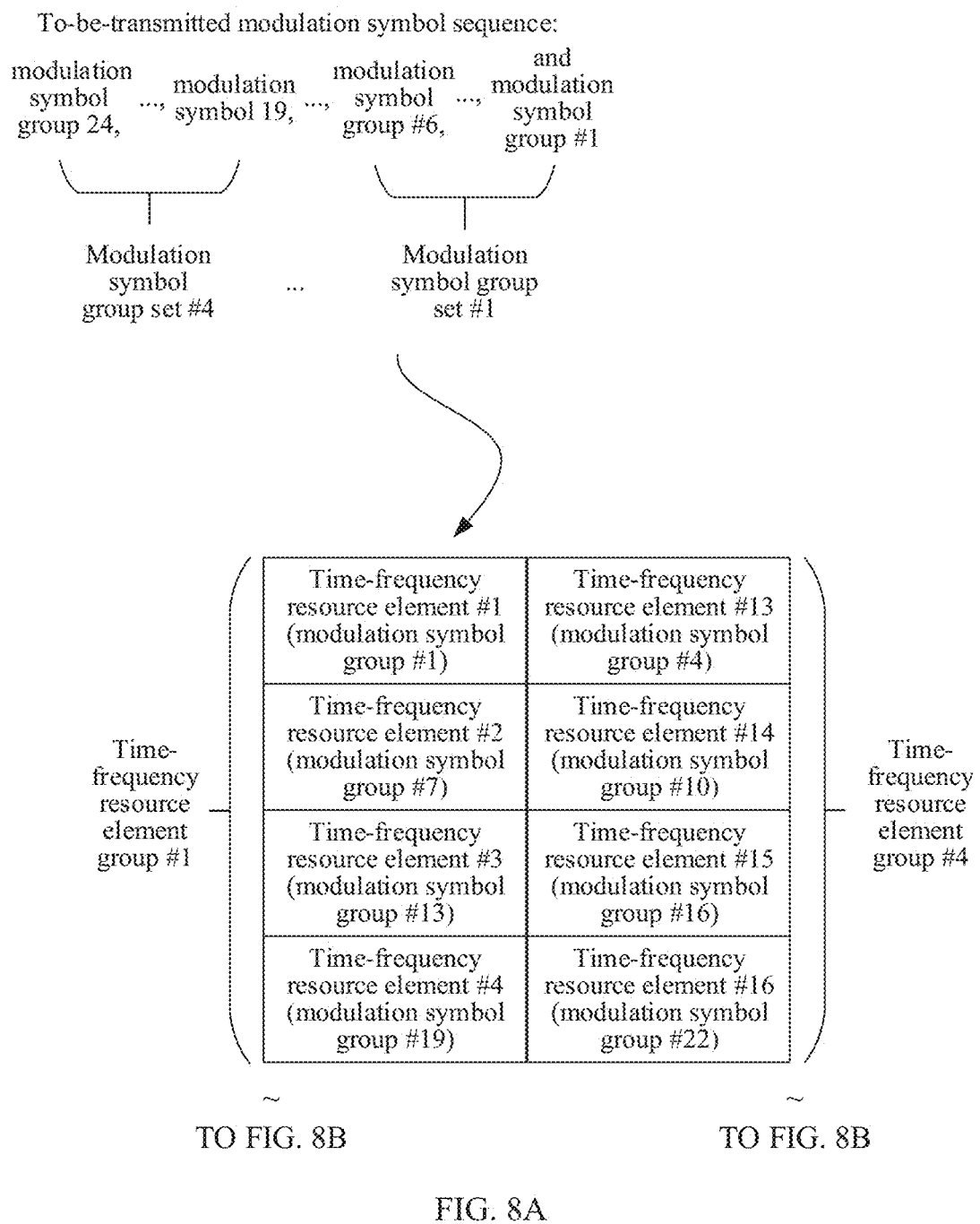
FIG. 8A and FIG. 8B are a schematic diagram of interleaving according to another embodiment of this application.
Figure 8B:
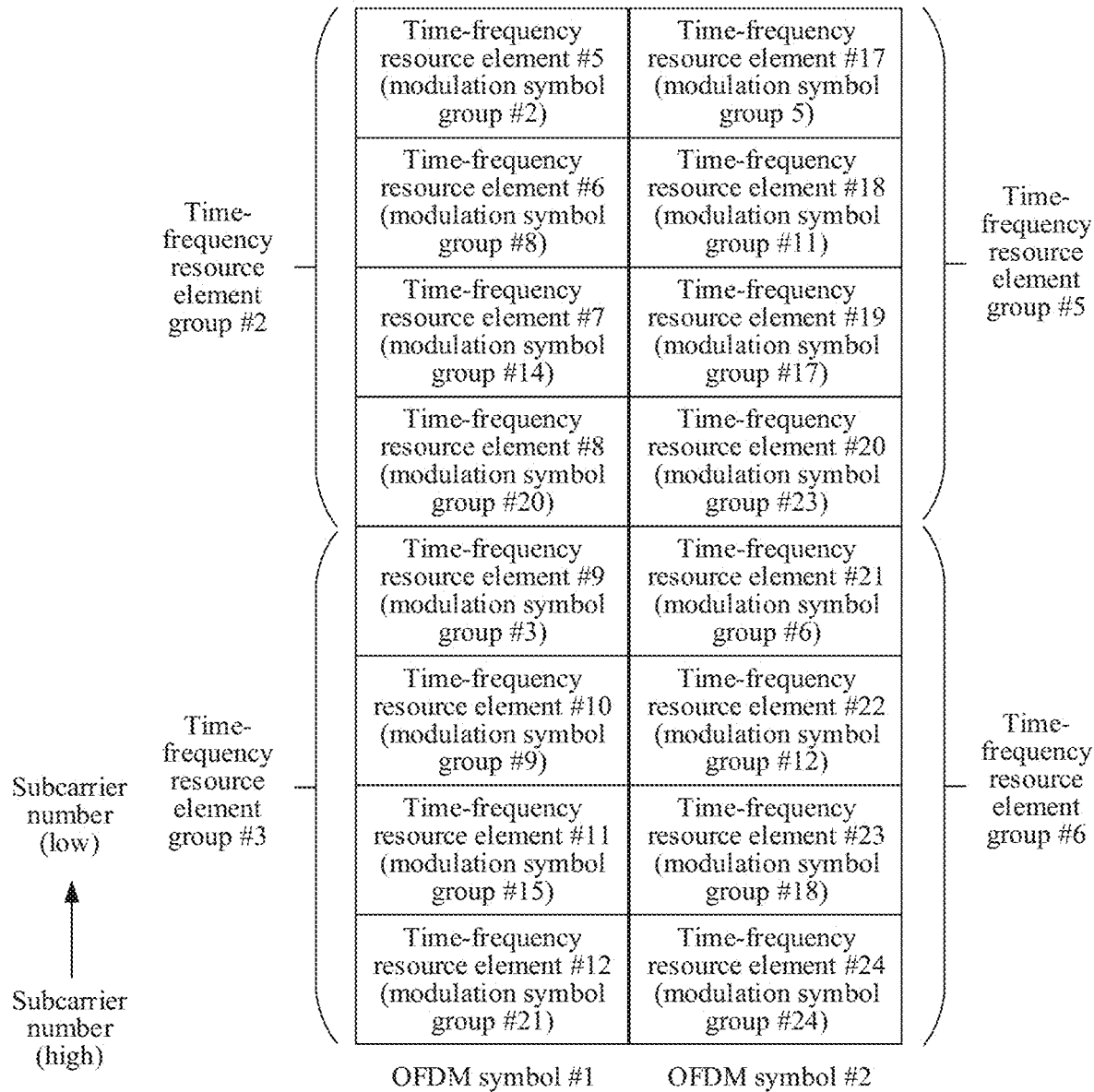

It should be understood that FIG. 7A and FIG. 7B show the case in which the modulation symbol sequence is sequentially divided into six group sets by using N modulation symbol groups as a group set. Alternatively, as shown in FIG. 8A and FIG. 8B, in another interleaving processing manner, the modulation symbol sequence may be sequentially divided into four group sets from the modulation symbol group #1 to the modulation symbol group #24 by using Z/N, namely, 24/4=6 modulation symbol groups as a group set, to be specific, the modulation symbol group #1 to the modulation symbol group #6 are a group set #1, the modulation symbol group #7 to the modulation symbol 12 are a group set #2, ..., then the first modulation symbol group in each group set, the second modulation symbol group in each group, ..., and the fourth modulation symbol group in each group are sequentially selected from the group set #1 to a group set #4, and the modulation symbol groups are sequentially mapped onto the time-frequency resource element #1 to the time-frequency resource element #24 in the selection order. Specifically, a result obtained after the interleaving processing is shown in FIG. 8A and FIG. 8B.

Specifically, Table 4 shows an order in which the modulation symbols are mapped onto the plurality of time-frequency resource element groups after interleaving processing is performed on the modulation symbol sequence in FIG. 8A and FIG. 8B. It can be learned from Table 4, FIG. 8A, and FIG. 8B that six consecutive modulation symbol groups (corresponding to M=Z/N=6) in the modulation symbol sequence are mapped onto the six time-frequency resource element groups in the plurality of time-frequency resource element groups. For example, the six consecutive modulation symbol groups, namely, the modulation symbol group #1 to the modulation symbol group #6 are respectively mapped onto the first time-frequency resource elements in the time-frequency resource element group #1 to the time-frequency resource element group #6.

TABLE 4

| Number of a modulation symbol group (modulation symbol) in a modulation symbol sequence | Number of modulation symbol group set | Number of a time-frequency resource element group | Number of a time-frequency resource element (RE) | Number of the modulation symbol group (modulation symbol) that is in the modulation symbol sequence and that is mapped onto the time-frequency resource element (RE) |
|---|---|---|---|---|
| 1 | 1 | 1 | 1 | 1 |
| 2 | | | 2 | 7 |
| 3 | | | 3 | 13 |
| 4 | | | 4 | 19 |
| 5 | | 2 | 5 | 2 |
| 6 | | | 6 | 8 |
| 7 | 2 | | 7 | 14 |
| 8 | | | 8 | 20 |
| 9 | | 3 | 9 | 3 |
| 10 | | | 10 | 9 |
| 11 | | | 11 | 15 |
| 12 | | | 12 | 21 |
| ... | ... | ... | ... | ... |
| 24 | | | 24 | 24 |

It should be understood that FIG. 6A, FIG. 6B, FIG. 8A, and FIG. 8B show only three interleaving manners in which the modulation symbol group is used as an interleaving unit. During actual application, interleaving may be performed by using the modulation symbol group as an interleaving unit in a plurality of manners. This embodiment of this application is not limited thereto.

It should be understood that the examples in FIG. 5 to FIG. 8B are described merely by using an example in which one time-frequency resource element includes one RE and one modulation symbol group includes one modulation symbol. However, this embodiment of this application is not limited thereto. During actual application, one time-frequency resource element may include a resource block including K consecutive subcarriers on L OFDM symbols, where L is an integer greater than or equal to 1, and K is an integer greater than or equal to 1. The modulation symbol group includes L*K modulation symbols of the data transmission block. When L=1, and K=1, the time-frequency resource element includes one RE. When L=1, one time-frequency resource may include K REs on the OFDM symbol. For example, a value of K may be 2, 3, 4, 14, 24, or the like. This embodiment of this application is not limited thereto.

It should be noted that FIG. 5 to FIG. 7B show cases in which the interleaving unit is one RE. However, during actual application, a modulation symbol mapped onto a time-frequency resource includes a reference signal (for example, a CSI-RS) used for channel estimation or a reference signal (for example, a DMRS) used for demodulation. Usually, a time-frequency resource location of a reference signal is fixed. Therefore, if there are reference signals, and if interleaving is still performed by using the RE as an interleaving unit, locations of the reference signals are disrupted. Consequently, the receive end cannot perform channel estimation or data demodulation, and network performance is affected.

For this problem, specific interleaving solutions are described in different cases in the embodiments of this application. The following provides detailed descriptions separately with reference to the different cases.

Case 1:

In this embodiment of this application, when there is a reference signal, a relatively large interleaving unit may be used for interleaving, so that after interleaving, a location of the reference signal remains unchanged, and further the foregoing problem can be resolved.

For example, one time-frequency resource element includes a resource block including 12 subcarriers on at least one OFDM symbol. For ease of description, in this specification, an example in which one time-frequency resource element includes a resource block including 12 subcarriers on one OFDM symbol is used for description. To be specific, one time-frequency resource element includes 12 consecutive REs on one OFDM symbol. That is, a frequency domain bandwidth of one time-frequency resource element is the same as a frequency domain width of one RB. Usually, a location of a reference signal in the RB is fixed. Therefore, after interleaving processing, a relative location of the reference signals on a frequency domain resource corresponding to the RB does not change by setting the interleaving unit, namely, the 12 REs, to be the same as the frequency domain width of the RB. Therefore, the foregoing problem that the locations of the reference signals are disrupted when there are reference signals can be resolved.

It should be understood that in this example, the 12 subcarriers are used as an example for description, but this embodiment of this application is not limited thereto. During actual application, a distribution interval of reference signals in frequency domain in NR may be p*12, where p is an integer greater than 1. In this case, a quantity of subcarriers that are on the at least one OFDM symbol and that are included in the time-frequency resource element should also be correspondingly adjusted. For example, the quantity of the subcarriers that are on the at least one OFDM symbol and that are included in the time-frequency resource element is a multiple of p*12.

Specifically, in Case 1, the modulation symbol sequence may include a modulation symbol of a data transport block and a modulation symbol of a reference signal included in a scheduling resource corresponding to the data transport block, and the time-frequency resource element group is a physical time-frequency resource element group. It should be understood that in this embodiment of this application, a physical time-frequency resource element may be used to carry the modulation symbol of the data transmission block, and may also be used to carry the modulation symbol of the reference signal.

For an interleaving method in this case, refer to the descriptions in FIG. 5 to FIG. 8B. The interleaving method in Case 1 may be obtained provided that the time-frequency resource element in FIG. 5 to FIG. 8B is replaced with 12 consecutive REs on an OFDM symbol, and the modulation symbol group is replaced with 12 consecutive modulation symbols in consecutive modulation symbol sequences. To avoid repetition, details are not described herein again.

Therefore, in this embodiment of this application, the relatively large interleaving unit is used, so that the location of the reference signal can be prevented from being affected. In addition, all OFDM symbols may be interleaved by using a same interleaving solution, so that implementation complexity is low.

Case 2:

In this embodiment of this application, when there is no reference signal, to be specific, when the to-be-transmitted modulation symbol sequence does not include a modulation symbol of a reference signal, a relatively small interleaving unit is used for interleaving. The relatively small interleaving unit is used, so that an interleaving depth can be increased, and a diversity gain can be increased.

For example, one time-frequency resource element is set to include one RE, two REs, three REs, or the like. The embodiment of this application is not limited thereto.

Specifically, in Case 2, the modulation symbol sequence includes only a modulation symbol of a data transport block, and the time-frequency resource element group is a physical time-frequency resource element group.

For an interleaving method in this case, refer to the descriptions in FIG. 5 to FIG. 8B. The interleaving method in Case 2 may be obtained provided that the time-frequency resource element in FIG. 5 to FIG. 8B is replaced with the time-frequency resource element in Case 2, and the modulation symbol group is replaced with a modulation symbol group in Case 2. To avoid repetition, details are not described herein again.

Therefore, in this embodiment of this application, all OFDM symbols may be interleaved by using a same interleaving solution, and in this embodiment of this application, the relatively small interleaving unit is used, so that the interleaving depth can be increased, and the diversity gain can be increased.

Case 3

When there is a reference signal in a transmission resource, in an embodiment of this application, during interleaving, modulation symbols of the reference signal may not be interleaved. In this case, the modulation symbol sequence may not include the modulation symbol of the reference signal, but include only a modulation symbol of a data transport block. In this case, the plurality of time-frequency resource groups configured to carry the to-be-transmitted modulation symbol sequence is a logical time-frequency resource element group, and the logical time-frequency resource element group includes a time-frequency resource element that is of a physical time-frequency resource and that is configured to carry only the modulation symbol of the data transport block, where the physical time-frequency resource includes the time-frequency resource element used to carry the modulation symbol of the data transport block and a time-frequency resource element used to carry a modulation symbol of a reference signal included in a scheduling resource corresponding to the data transport block.

Figure 9:
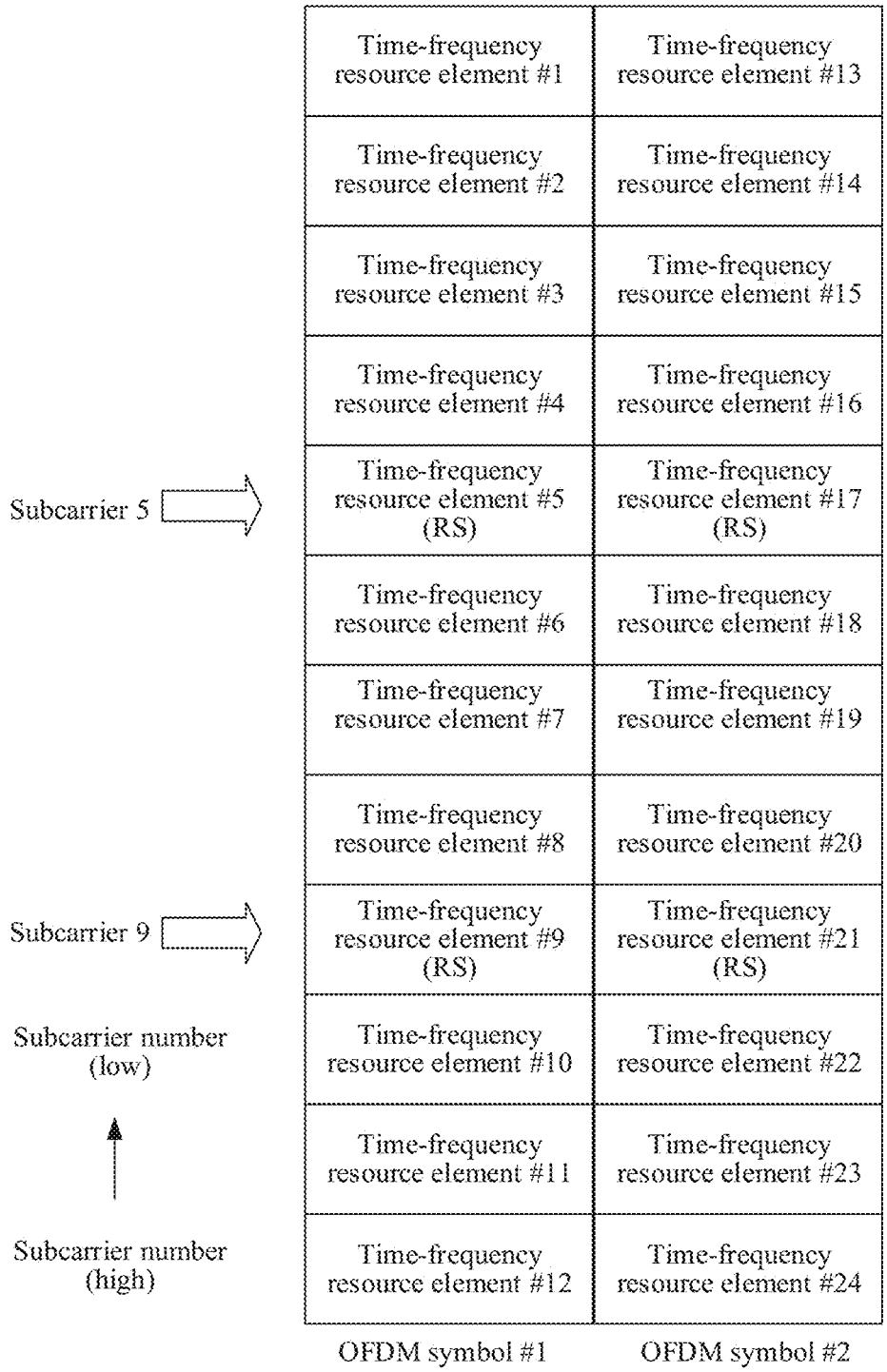
FIG. 9 is a schematic diagram of a physical time-frequency resource according to an embodiment of this application.

For example, as shown in FIG. 9, it is assumed that the physical time-frequency resource includes all frequency domain resources, namely, 12 subcarriers, that are on two OFDM symbols, namely, an OFDM #1 and an OFDM #2 and that are configured to carry a data modulation symbol and the reference signal. There are 24 time-frequency resource elements in total (the time-frequency resource element includes one RE), namely, the time-frequency resource element #1 to the time-frequency resource element #24. The time-frequency resource element #5, the time-frequency resource element #9, the time-frequency resource element #17, and the time-frequency resource element #21 that correspond to a subcarrier 5 and a subcarrier 9 are configured to carry the RS.

Figure 10:
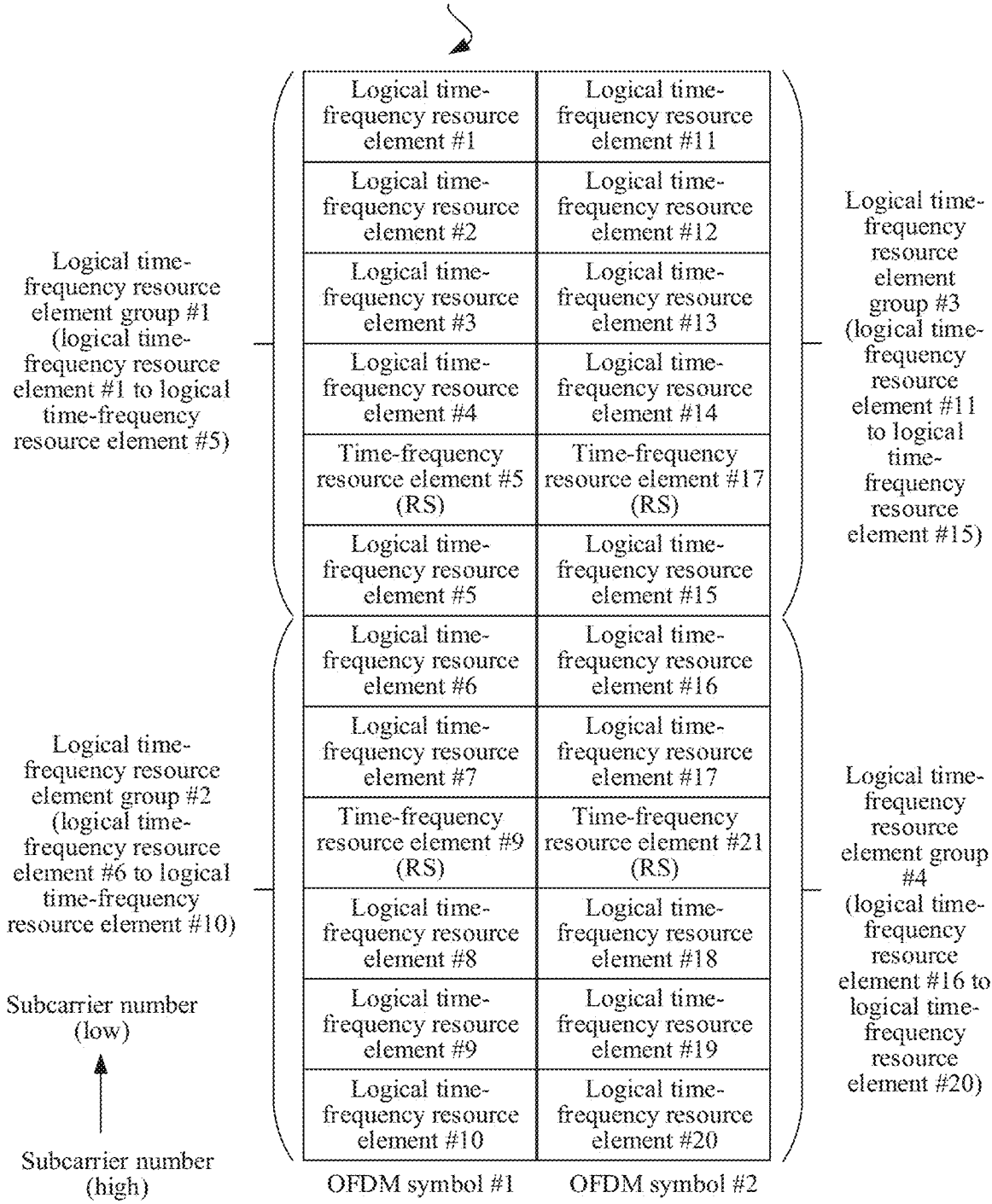
FIG. 10 is a schematic diagram of a plurality of time-frequency resource element groups according to an embodiment of this application.

To avoid interleaving modulation symbols of the reference signal, as shown in FIG. 10, in this embodiment of this application, a resource, to be specific, a plurality of time-frequency resource elements, configured to carry the modulation symbol sequence, includes only all frequency-domain resources, namely, 10 of the foregoing 12 subcarriers, namely, subcarriers 1 to 4, 6 to 8, and 10 to 12, that are on the OFDM #1 and the OFDM #2 and that are configured to carry the data modulation symbol. A time-frequency resource element includes one RE, a modulation symbol group includes one modulation symbol, and a time-frequency resource element group includes five resource elements (to be specific, N=5). Therefore, as shown in FIG. 10, the plurality of time-frequency resource element groups include four logical time-frequency resource element groups in total, namely, a logical time-frequency resource element group #1 to a logical time-frequency resource element group #4.

Each logical time-frequency resource element group includes the time-frequency resource element that is of the physical time-frequency resource and that is configured to carry only the modulation symbol of the data transport block. In this embodiment of this application, the time-frequency resource element included in the logical time-frequency resource element group may be referred to as a logical time-frequency resource element, and the 20 logical time-frequency resource elements (namely, 20 REs) in the four logical time-frequency resource element groups may be sequentially numbered to obtain a logical time-frequency resource element #1 to a logical time-frequency resource element #20. Therefore, as shown in FIG. 9 and FIG. 10, a correspondence between the logical time-frequency resource elements in FIG. 10 and the time-frequency resource elements of the physical time-frequency resource in FIG. 9 is shown in the following Table 5. Correspondingly, the modulation symbol sequence includes only the modulation symbol of the data transmission block. The modulation symbol sequence includes 20 modulation symbol groups, namely, a modulation symbol group #1, a modulation symbol group #2, . . . , and a modulation symbol group #20.

TABLE 5

| Number of a time-frequency resource element (physical time-frequency resource element) | Number of a logical time-frequency resource element |
|---|---|
| 1 | 1 |
| 2 | 2 |
| 3 | 3 |
| 4 | 4 |
| 5 | None |
| 6 | 5 |
| 7 | 6 |
| 8 | 7 |
| 9 | None |
| 10 | 8 |
| 11 | 9 |
| 12 | 10 |
| 13 | 11 |
| 14 | 12 |
| 15 | 13 |
| 16 | 14 |
| 17 | None |
| 18 | 15 |
| 19 | 16 |
| 20 | 17 |
| 21 | None |
| 22 | 18 |
| 23 | 19 |
| 24 | 20 |

It should be understood that in this embodiment of this application, resource elements may be numbered in an order of first subcarriers and then OFDM symbols, or may be numbered in an order of first OFDM symbols and then subcarriers. This embodiment of this application is not limited thereto.

It should be understood that, in a case of non-interleaved transmission, the modulation symbol sequence, to be specific, the modulation symbol group #1 to the modulation symbol group #20, may be respectively carried by using the logical time-frequency resource element #1 to the logical time-frequency resource element #20.

It should be understood that in Case 3, a difference between an interleaving process and method for modulation symbols of the data transmission block in the logical resource element group and an interleaving process and method type of the modulation symbols in the physical resource element group in FIG. 6A to FIG. 8B lies in that the time-frequency resource element group in Case 3 is the logical time-frequency resource element group. To make interleaving of the modulation symbol sequence in the logical time-frequency resource element clearer, the following provides detailed descriptions with reference to FIG. 11A to FIG. 13B.

Figure 11A:
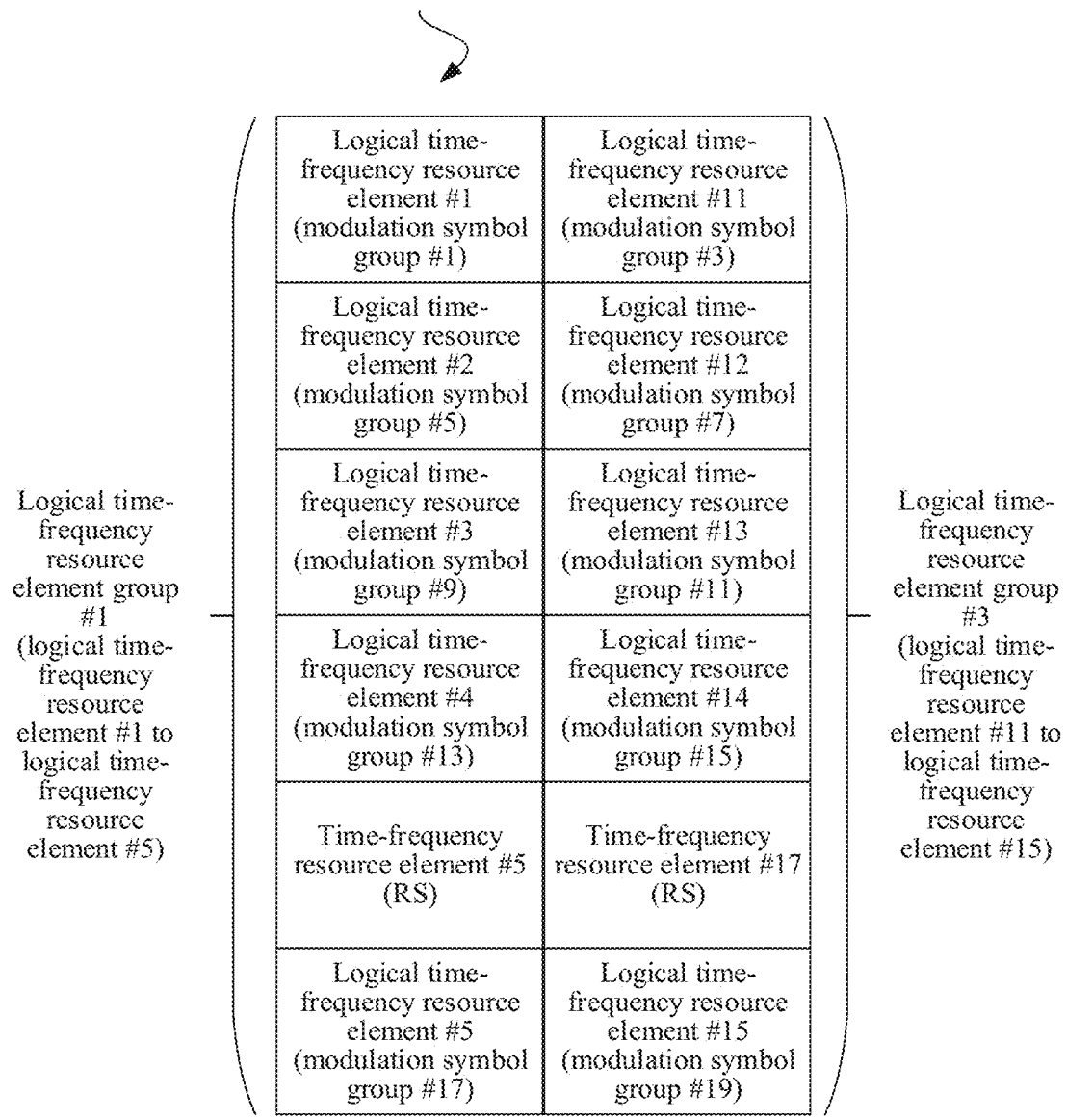
FIG. 11A and FIG. 11B are a schematic diagram of interleaving according to another embodiment of this application.
Figure 11B:
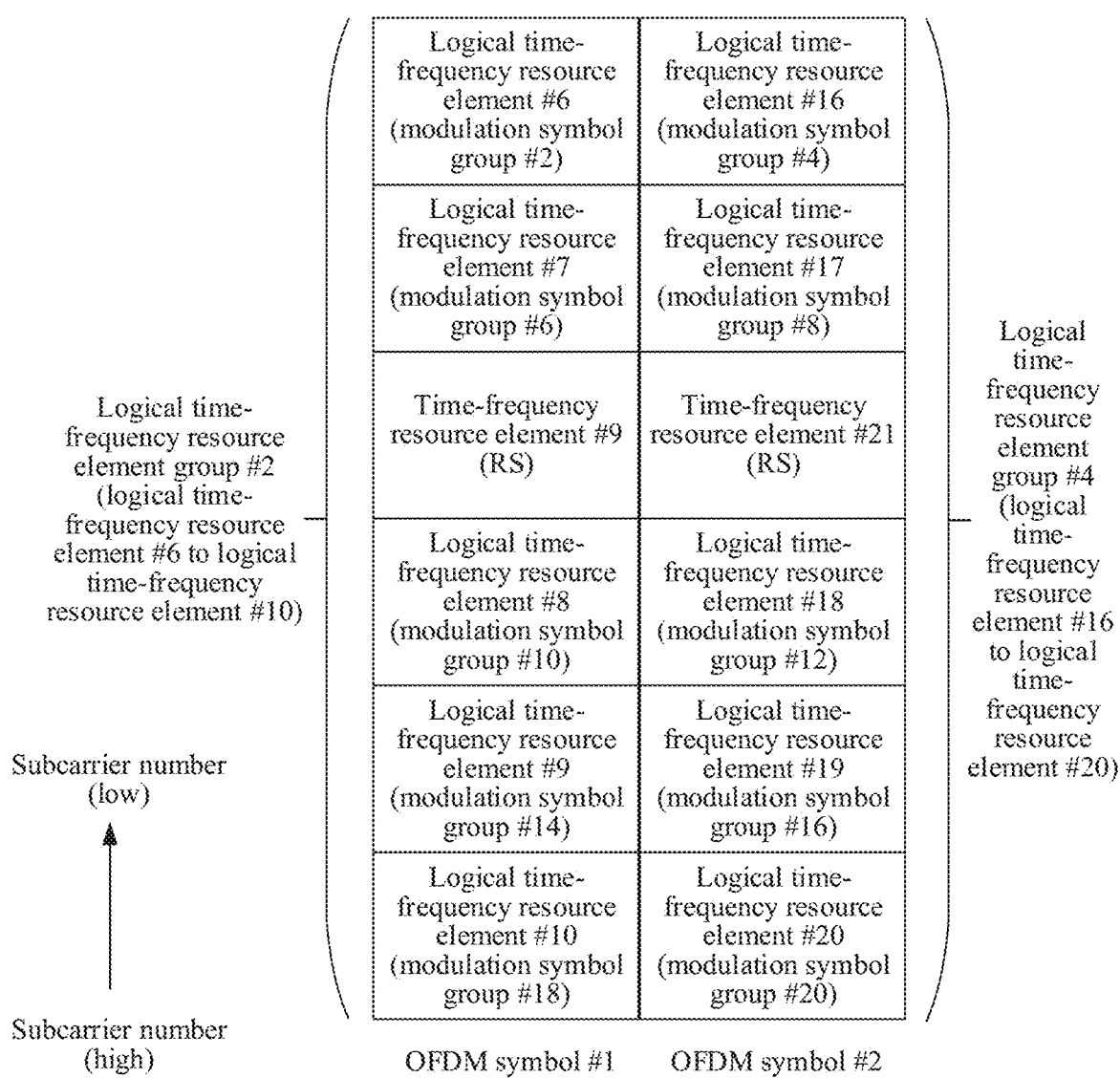

For example, FIG. 11A and FIG. 11B show a result of interleaving the corresponding modulation symbol sequence in FIG. 10 in one manner. Specifically, N=5, a logical time-frequency resource element includes one RE, and an interleaving processing manner shown in FIG. 11A and FIG. 11B is mapping the modulation symbol sequence sequentially onto the first logical time-frequency resource elements (namely, the first REs) in the logical time-frequency resource element group #1 to the logical time-frequency resource element group #4, the second logical time-frequency resource elements in the logical time-frequency resource element group #1 to the logical time-frequency resource element group #4, the third logical time-frequency resource elements in the logical time-frequency resource element group #1 to the logical time-frequency resource element group #4, the fourth logical time-frequency resource elements in the logical time-frequency resource element group #1 to the logical time-frequency resource element group #4, and the fifth logical time-frequency resource elements in the logical time-frequency resource element group #1 to the logical time-frequency resource element group #4 from the modulation symbol group #1 to the modulation symbol group #20. Specifically, a result obtained after the interleaving processing is shown in FIG. 11A and FIG. 11B.

Specifically, Table 6 shows an order in which the modulation symbols are mapped onto the plurality of logical time-frequency resource element groups after interleaving processing is performed on the modulation symbol sequence in FIG. 11A and FIG. 11B. It can be learned from Table 6, FIG. 1A, and FIG. 11B that four consecutive modulation symbol groups (corresponding to M=4=Z/N) in the modulation symbol sequence are mapped onto the four logical time-frequency resource element groups in the plurality of logical time-frequency resource element groups. For example, the four consecutive modulation symbol groups, namely, the modulation symbol group #1 to the modulation symbol group #4 are respectively mapped onto the logical time-frequency resource element group #1 to the logical time-frequency resource element group #4.

TABLE 6

| Number of a modulation symbol group (modulation symbol) in a modulation symbol sequence | Number of a logical time-frequency resource element group | Number of a logical time-frequency resource element (RE) | Number of the modulation symbol group (modulation symbol) that is in the modulation symbol sequence and that is mapped onto the logical time-frequency resource element (RE) | Number of a time-frequency resource element (physical time-frequency resource element) |
|---|---|---|---|---|
| 1 | 1 | 1 | 1 | 1 |
| 2 | | 2 | 5 | 2 |
| 3 | | 3 | 9 | 3 |
| 4 | | 4 | 13 | 4 |
| 5 | | 5 | 17 | 6 |
| 6 | 2 | 6 | 2 | 7 |
| 7 | | 7 | 6 | 8 |
| 8 | | 8 | 10 | 10 |
| 9 | | 9 | 14 | 11 |
| 10 | | 10 | 18 | 12 |
| 11 | ... | 11 | 3 | 13 |
| ... | | ... | ... | ... |
| 20 | | 20 | 20 | 24 |

Figure 12A:
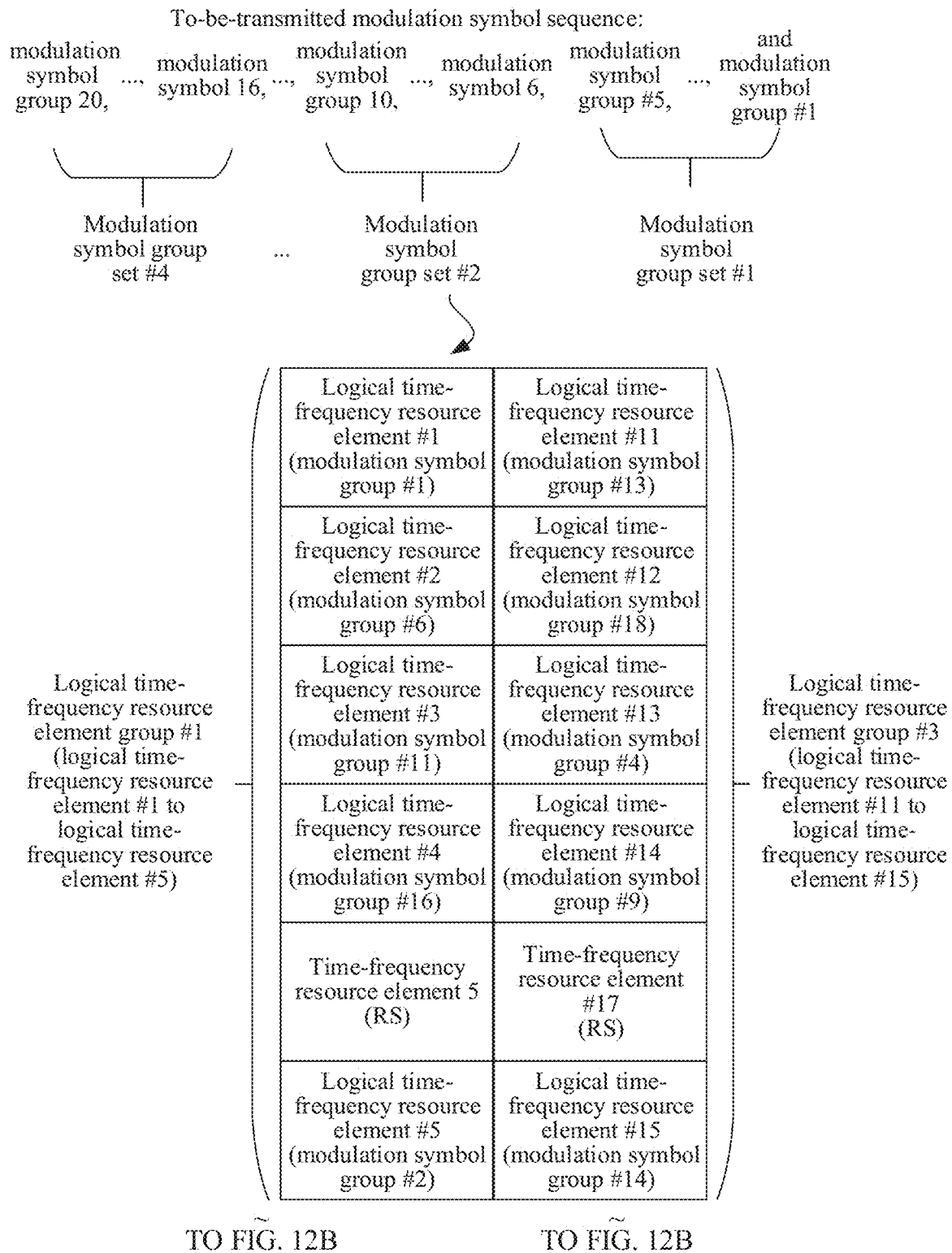

For another example, FIG. 12A and FIG. 12B show a result of interleaving the corresponding modulation symbol sequence in FIG. 10 in another manner. Specifically, N=5, a logical time-frequency resource element includes one RE, and the interleaving processing manner shown in FIG. 12A and FIG. 12B is dividing, from the modulation symbol group #1 to the modulation symbol group #20, the modulation symbol sequence into four group sets by using N modulation symbol groups as a group set, to be specific, the modulation symbol group #1 to the modulation symbol group #5 are a group set #1, the modulation symbol group #6 to the modulation symbol 10 are a group set #2, . . . , then sequentially selecting the first modulation symbol group in each group set, the second modulation symbol group in each group, . . . , and the fifth modulation symbol group in each group from the group set #1 to a group set #4, and sequentially mapping the modulation symbol groups onto the logical time-frequency resource element #1 to the logical time-frequency resource element #20 in the selection order. Specifically, a result obtained after the interleaving processing is shown in FIG. 12A and FIG. 12B.

Specifically, Table 7 shows an order in which the modulation symbols are mapped onto the plurality of logical time-frequency resource element groups after interleaving processing is performed on the modulation symbol sequence in FIG. 12A and FIG. 12B. It can be learned from Table 7. FIG. 12A, and FIG. 12B that five consecutive modulation symbol groups (corresponding to M=N=5) in the modulation symbol sequence are mapped onto four logical time-frequency resource element groups in the plurality of logical time-frequency resource element groups. For example, the five consecutive modulation symbol groups, namely, the consecutive modulation symbol group #1 to the consecutive modulation symbol group #5 are respectively mapped onto the logical time-frequency resource element group #1, the logical time-frequency resource element group #1, the logical time-frequency resource element group #2, the logical time-frequency resource element group #3, and the logical time-frequency resource element group #4.

TABLE 7

| Number of a modulation symbol group (modulation symbol) in a modulation symbol sequence | Number of modulation symbol group set | Number of a logical time-frequency resource element group | Number of a logical time-frequency resource element (RE) | Number of the modulation symbol group (modulation symbol) that is in the modulation symbol sequence and that is mapped onto the logical time-frequency resource element (RE) | Number of a time-frequency resource element (physical time-frequency resource element) |
|---|---|---|---|---|---|
| 1 | 1 | 1 | 1 | 1 | 1 |
| 2 | | | 2 | 6 | 2 |
| 3 | | | 3 | 11 | 3 |
| 4 | | | 4 | 16 | 4 |
| 5 | | | 5 | 2 | 6 |
| 6 | 2 | 2 | 6 | 7 | 7 |
| 7 | | | 7 | 12 | 8 |
| 8 | | | 8 | 17 | 10 |
| 9 | | | 9 | 3 | 11 |
| 10 | | | 10 | 8 | 12 |
| 11 | ... | ... | 11 | 13 | 13 |
| ... | | | ... | ... | ... |
| 20 | | | 20 | 20 | 24 |

Figure 13A:
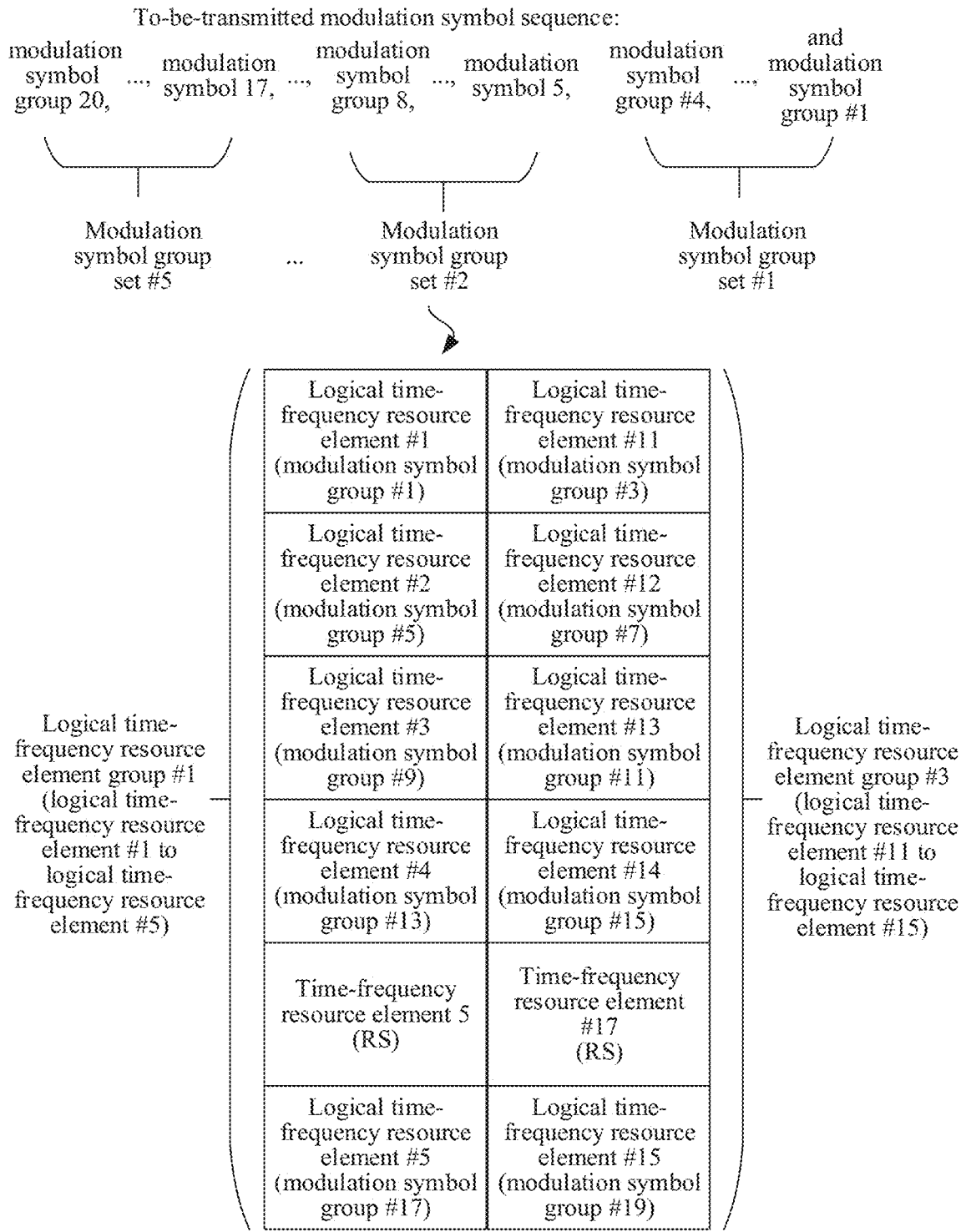
FIG. 13A and FIG. 13B are a schematic diagram of interleaving according to another embodiment of this application.
Figure 13B:
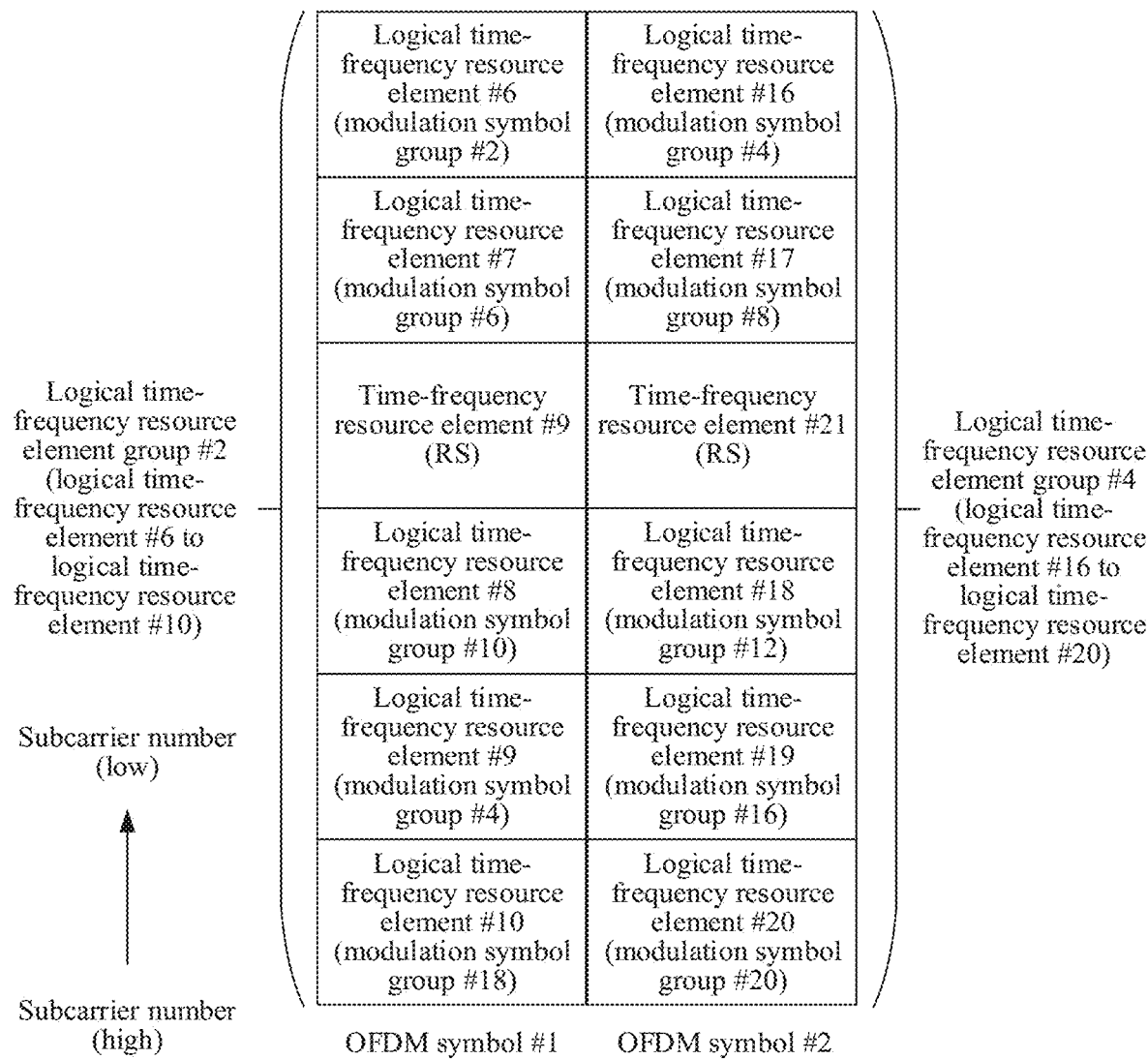

It should be understood that FIG. 12A and FIG. 12B show a case in which the modulation symbol sequence is divided into four group sets by using N modulation symbol groups as a group set. Alternatively, as shown in FIG. 13A and FIG. 13B, in another interleaving processing manner, the modulation symbol sequence may be sequentially divided into five group sets from the modulation symbol group #1 to the modulation symbol group #24 by using Z/N, namely, 20/5=4 modulation symbol groups as a group set, to be specific, the modulation symbol group #1 to the modulation symbol group #4 are a group set #1, the modulation symbol group #5 to the modulation symbol 8 are a group set #2, . . . , then the first modulation symbol group in each group set, the second modulation symbol group in each group, . . . , and the fourth modulation symbol group in each group are sequentially selected from the group set #1 to a group set #5, and the modulation symbol groups are sequentially mapped onto the logical time-frequency resource element #1 to the logical time-frequency resource element #20 in the selection order. Specifically, a result obtained after interleaving processing is shown in FIG. 13A and FIG. 13B.

Specifically, Table 8 shows an order in which the modulation symbols are mapped onto the plurality of logical time-frequency resource element groups after interleaving processing is performed on the modulation symbol sequence in FIG. 13A and FIG. 13B. It can be learned from Table 8, FIG. 13A, and FIG. 13B that four consecutive modulation symbol groups (corresponding to M=Z/N=4) in the modulation symbol sequence are mapped onto the four logical time-frequency resource element groups in the plurality of logical time-frequency resource element groups. For example, the four consecutive modulation symbol groups, namely, the modulation symbol group #1 to the modulation symbol group #4 are respectively mapped onto the first logical time-frequency resource element in the logical time-frequency resource element group #1 to the logical time-frequency resource element group #4.

TABLE 8

| Number of a modulation symbol group (modulation symbol) in a modulation symbol sequence | Number of modulation symbol group set | Number of modulation symbol group set | Number of a logical time-frequency resource element group | Number of a logical time-frequency resource element (RE) | Number of the modulation symbol group (modulation symbol) that is in the modulation symbol sequence and that is mapped onto the logical time-frequency resource element RE | Number of a time-frequency resource element (physical time-frequency resource element) |
|---|---|---|---|---|---|---|
| 1 | 1 | 1 | 1 | 1 | 1 | 1 |
| 2 | | | | 2 | 5 | 2 |
| 3 | | | | 3 | 9 | 3 |
| 4 | | | | 4 | 13 | 4 |
| 5 | 2 | | | 5 | 17 | 6 |
| 6 | | 2 | 2 | 6 | 2 | 7 |
| 7 | | | | 7 | 6 | 8 |
| 8 | | | | 8 | 10 | 10 |

TABLE 8-continued

| Number of a modulation symbol group (modulation symbol) in a modulation symbol sequence | Number of modulation symbol group set | Number of modulation symbol group set | Number of a logical time-frequency resource element group | Number of a logical time-frequency resource element (RE) | Number of the modulation symbol group (modulation symbol) that is in the modulation symbol sequence and that is mapped onto the logical time-frequency resource element RE | Number of a time-frequency resource element (physical time-frequency resource element) |
|---|---|---|---|---|---|---|
| 9 | 3 | | | 9 | 14 | 11 |
| 10 | | | | 10 | 18 | 12 |
| 11 | | ... | ... | 11 | 3 | 13 |
| 12 | | | | 12 | 14 | 14 |
| ... | ... | | | ... | ... | ... |
| 20 | | | | 20 | 70 | 24 |

It should be understood that FIG. 11A, FIG. 11B, FIG. 13A, and FIG. 13B show only three interleaving manners in which the modulation symbol group is used as an interleaving unit. During actual application, interleaving may be performed by using the modulation symbol group as an interleaving unit in a plurality of manners. This embodiment of this application is not limited thereto.

In this embodiment of this application, the reference signal is skipped, and modulation symbols of the data transport block are interleaved in the logical resource element group without being affected by the reference signal. In addition, because a base station and UE are very clear about a location of a pilot frequency, implementation complexity is low.

Case 4:

In this embodiment of this application, when there is a reference signal, a relatively large interleaving unit such as a second time-frequency resource element may be used for a resource part that carries the reference signal, and a relatively small interleaving unit such as a first time-frequency resource element may be used for a resource part that does not carry the reference signal.

Specifically, the modulation symbol sequence includes a first modulation symbol sequence and a second modulation symbol sequence, the plurality of time-frequency resource element groups include a first time-frequency resource element group set and a second time-frequency resource element group set, the first time-frequency resource element group set is used to carry the first modulation symbol sequence, the second time-frequency resource element group set is used to carry the second modulation symbol sequence, the first time-frequency resource element group set includes at least two first time-frequency resource element groups, the first time-frequency resource element group includes $N_1$ first time-frequency resource elements, $N_1$ is an integer greater than or equal to 2, the second time-frequency resource element group set includes at least two second time-frequency resource element groups, the second time-frequency resource element group includes $N_2$ second time-frequency resource elements, $N_2$ is an integer greater than or equal to 2, one first time-frequency resource element is used to carry one first modulation symbol group, and one second time-frequency resource element is used to carry one second modulation symbol group, where a quantity of resource elements REs included in the first time-frequency resource element is different from that of resource elements REs included in the second time-frequency resource element.

An interleaving processing process may include: performing, by the transmit end device, interleaving processing on the first modulation symbol sequence by using the first time-frequency resource element group as an interleaving unit, and performing interleaving processing on the second modulation symbol sequence by using the second time-frequency resource element group as an interleaving unit, to obtain a first order in which the first modulation symbol sequence is mapped onto the first time-frequency resource element group set and a second order in which the second modulation symbol sequence is mapped onto the second time-frequency resource element group set, where a plurality of consecutive first modulation symbol groups in the first modulation symbol sequence are mapped onto the at least two first time-frequency resource element groups in the first time-frequency resource element group set, and a plurality of consecutive second modulation symbol groups in the second modulation symbol sequence are mapped onto the at least two second time-frequency resource element groups in the second time-frequency resource element group set.

For example, the first modulation symbol sequence is a front part of the modulation symbol sequence, and does not include a modulation symbol of the reference signal, the first modulation symbol sequence includes a plurality of first modulation symbol groups, and the first time-frequency resource element group set is used to transmit the first modulation symbol sequence; and the second modulation symbol sequence is a latter part of the modulation symbol sequence, and includes both the modulation symbol of the reference signal and a data modulation symbol, the second modulation symbol sequence includes a plurality of second modulation symbol groups, and the second time-frequency resource element group set is used to transmit the second modulation symbol sequence.

Specifically, because no reference signal is transmitted in the first time-frequency resource element group set, for a first modulation symbol, to increase an interleaving depth and increase a diversity gain, a relatively small interleaving unit, namely, the first time-frequency resource element, may be used. For example, the first time-frequency resource element includes one RE, two REs, three REs, or the like. This embodiment of this application is not limited thereto.

Because a reference signal is transmitted in the second time-frequency resource element group set, for a second modulation symbol, to ensure relative locations of reference signals, a relatively large interleaving unit, namely, the second time-frequency resource element, may be used. For example, one second time-frequency resource element includes a resource block including 12 subcarriers on at least one OFDM symbol. For ease of description, in this specification, an example in which one second time-frequency resource element includes a resource block including 12 subcarriers on one OFDM symbol is used for description. To be specific, one second time-frequency resource element includes 12 consecutive REs on one OFDM symbol. That is, a frequency domain bandwidth of one second time-frequency resource element is the same as a frequency domain width of one RB. Usually, a location of a reference signal in the RB is fixed. Therefore, after interleaving processing, a relative location of the reference signal on a frequency domain resource corresponding to the RB does not change by setting the interleaving unit, namely, the 12 REs, to be the same as the frequency domain width of the RB. Therefore, a problem caused by disruption of the locations of the reference signals can be avoided.

It should be understood that in this example, the 12 subcarriers are used as an example for description, but this embodiment of this application is not limited thereto. During actual application, a distribution interval of reference signals in frequency domain in NR may be p*12, where p is an integer greater than 1. In this case, a quantity of subcarriers that are on the at least one OFDM symbol and that are included in the second time-frequency resource element should also be correspondingly adjusted. For example, the quantity of the subcarriers that are on the at least one OFDM symbol and that are included in the second time-frequency resource element is a multiple of p*12.

In Case 4, interleaving processing is separately performed independently on two modulation symbol sequences, to obtain the first order and the second order in which the two modulation symbol sequences are respectively mapped onto the first time-frequency resource element group set and the second time-frequency resource element group set.

Specifically, for interleaving of the first modulation symbol sequence, refer to the foregoing description for Case 2, and for interleaving of the second modulation symbol sequence, refer to the foregoing description for Case 1. To avoid repetition, details are not described herein again.

It should be understood that in this case, a value of the size $N_1$ of the first time-frequency resource element group and a value of the size $N_2$ of the second time-frequency resource element group may be the same or different. This embodiment of this application is not limited thereto. When $N_1=N_2$, a protocol may agree on the value, or a network device determines the value, and indicates the value to a terminal device by using signaling. When $N_1$ is different from $N_2$, the protocol may separately agree on the two values, or the network device determines the two values, and indicates the two values to the terminal device by using signaling. Optionally, the protocol may agree on a relationship between the two values, for example, a ratio of or a difference between the two values. In this case, the protocol may agree on a value of only one of the two values, and a receive end and a transmit end may determine the other value based on the relationship between the two values. Alternatively, the network device determines only a value, and indicates the value, and the receive end and the transmit end may determine the other value based on the value and a relationship between the two values.

Therefore, in this embodiment of this application, sizes of two resource element groups are set, so that it can be ensured that a maximum interleaving depth is obtained as much as possible through interleaving performed under a premise that a reference signal is included. Because a base station and UE are very clear about a location of a pilot frequency, implementation complexity is still quite low.

The foregoing describes four solutions of performing interleaving by using different interleaving units in scenarios in which whether a reference signal is transmitted in a time-frequency resource. During actual application, in a scenario in which no reference signal is transmitted, the solution in Case 2 may be used. When a reference signal needs to be transmitted, the solutions in Case 1, Case 3, and Case 4 may be used. Specifically, when a reference signal needs to be transmitted, and a modulation symbol of the reference signal participates in interleaving, the solutions in Case 1 and Case 4 may be used; or when a reference signal needs to be transmitted, and a modulation symbol of the reference signal does not participate in interleaving, the solution in Case 3 may be used.

Therefore, in this embodiment of this application, the size of the interleaving unit may be flexibly determined depending on whether a reference signal is transmitted on a time-frequency resource, so that requirements in different transmission scenarios can be met.

430: The transmit end device sends the modulation symbol sequence in the order in which the modulation symbol sequence is mapped onto the plurality of time-frequency resource element groups.

It should be understood that in this embodiment of this application, before the modulation symbol sequence is sent, other processing may be further performed on the modulation symbol sequence. For example, the modulation symbol is precoded. This embodiment of this application is not limited thereto.

440: The receive end device de-interleaves the modulation symbols, to obtain the modulation symbol sequence.

Specifically, the receive end device may de-interleave the modulation symbols based on the size of the interleaving unit (namely, the time-frequency resource element group), to obtain the modulation symbol sequence. Further, the receive end device may perform other decoding processing on the modulation symbols, to obtain data sent by the transmit end. For a specific decoding process, refer to descriptions in an existing standard, and details are not described herein again.

Therefore, by using the interleaving method in this embodiment of this application, all OFDM symbols use one or two same interleaving solutions, to reduce interleaving complexity and improve system performance.

Figure 14:
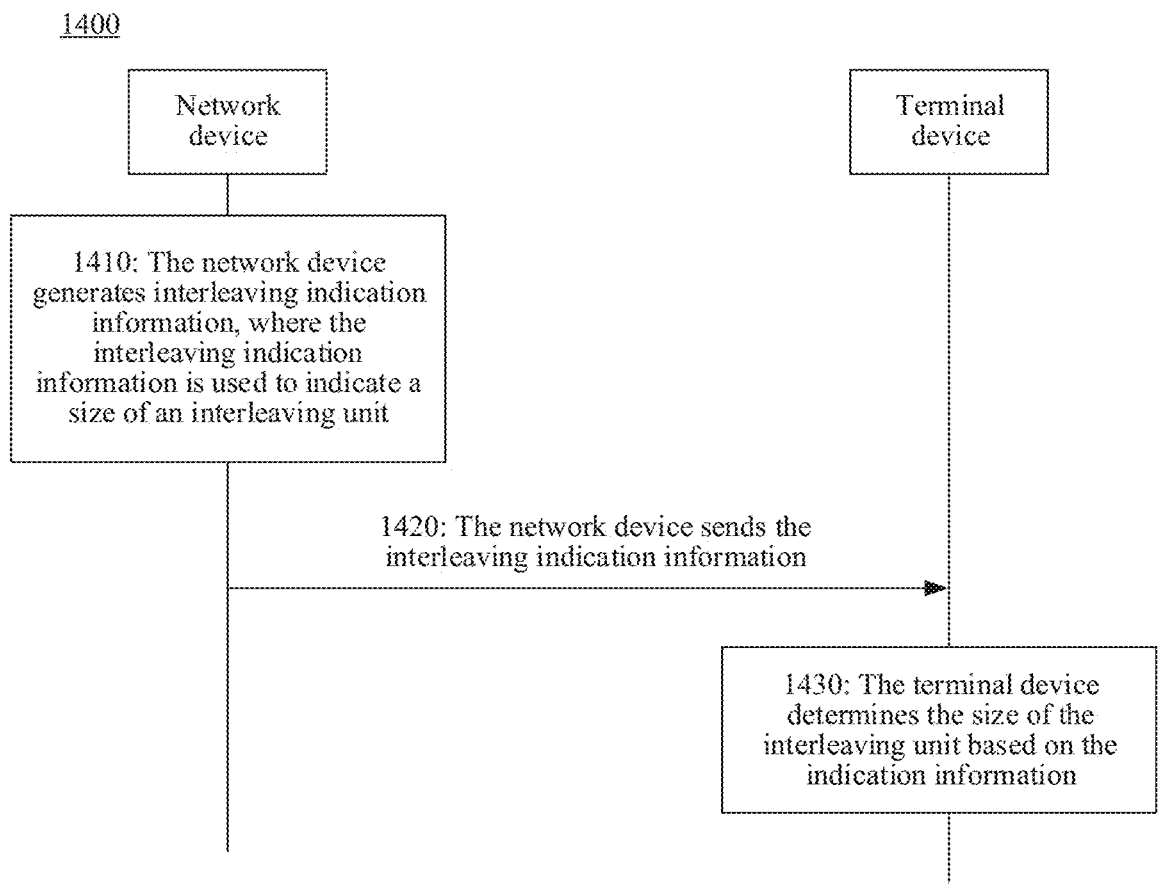
FIG. 14 is a schematic flowchart of an interleaving method according to an embodiment of this application.

FIG. 14 is a schematic flowchart of a data interleaving method according to another embodiment of this application from the perspective of device interaction. The method 1400 shown in FIG. 14 includes the following steps.

1410: A network device generates interleaving indication information, where the interleaving indication information is used to indicate a size of an interleaving unit, and the interleaving unit is a time-frequency resource element group or a modulation symbol group.

It should be understood that in this embodiment of this application, when the interleaving unit is the time-frequency resource element group, after interleaving processing, modulation symbols carried on one interleaving unit, namely, one time-frequency resource element group, are inconsecutive modulation symbols in a to-be-transmitted modulation symbol sequence.

When the interleaving unit is the modulation symbol group, after interleaving processing, modulation symbols in one interleaving unit, that is, one modulation symbol group, are mapped onto inconsecutive time-frequency resources.

It should be understood that the method may further include: before the network device generates the interleaving indication information, determining, by the network device, the size of the interleaving unit based on a transmission parameter, where the transmission parameter includes at least one of the following parameters: a scheduling bandwidth, a delay spread, and a moving speed of a terminal device.

Specifically, for a process in which the network device determines the interleaving unit, refer to the foregoing description of the second manner in 410, and details are not described herein again.

1420: The network device sends the interleaving indication information.

Specifically, the network device may send the indication information by using radio resource control RRC signaling, a media access control-control element MAC-CE, or downlink control information DCI. This embodiment of this application is not limited thereto.

Correspondingly, the terminal device receives the interleaving indication information.

1430: The terminal device determines the size of the interleaving unit based on the indication information.

Specifically, after obtaining the indication information, the terminal device may determine the size of the interleaving unit.

Further, a transmit end device (which may be a network device or a terminal device) may perform interleaving processing on the to-be-sent modulation symbol sequence by using the interleaving unit, and send modulation symbols on which interleaving processing is performed. A receive end device may perform de-interleaving processing on the modulation symbols based on the interleaving unit, to obtain the modulation symbol sequence.

Specifically, for an interleaving process, refer to the foregoing description for the interleaving method in the method embodiment in FIG. 4 to FIG. 13B. To avoid repetition, details are not described herein again. Optionally, for the interleaving process in this embodiment of this application, refer to an interleaving process in the prior art. This embodiment of this application is not limited thereto.

Therefore, the network device may flexibly determine, based on the transmission parameter, a size of the time-frequency resource group that corresponds to the transmission parameter, and can determine different sizes of the time-frequency resource group based on different values of the parameter, to meet interleaving requirements in different scenarios, and a prior-art problem of high complexity caused by interleaving performed by using a CB as a unit can be resolved.

Figure 15:
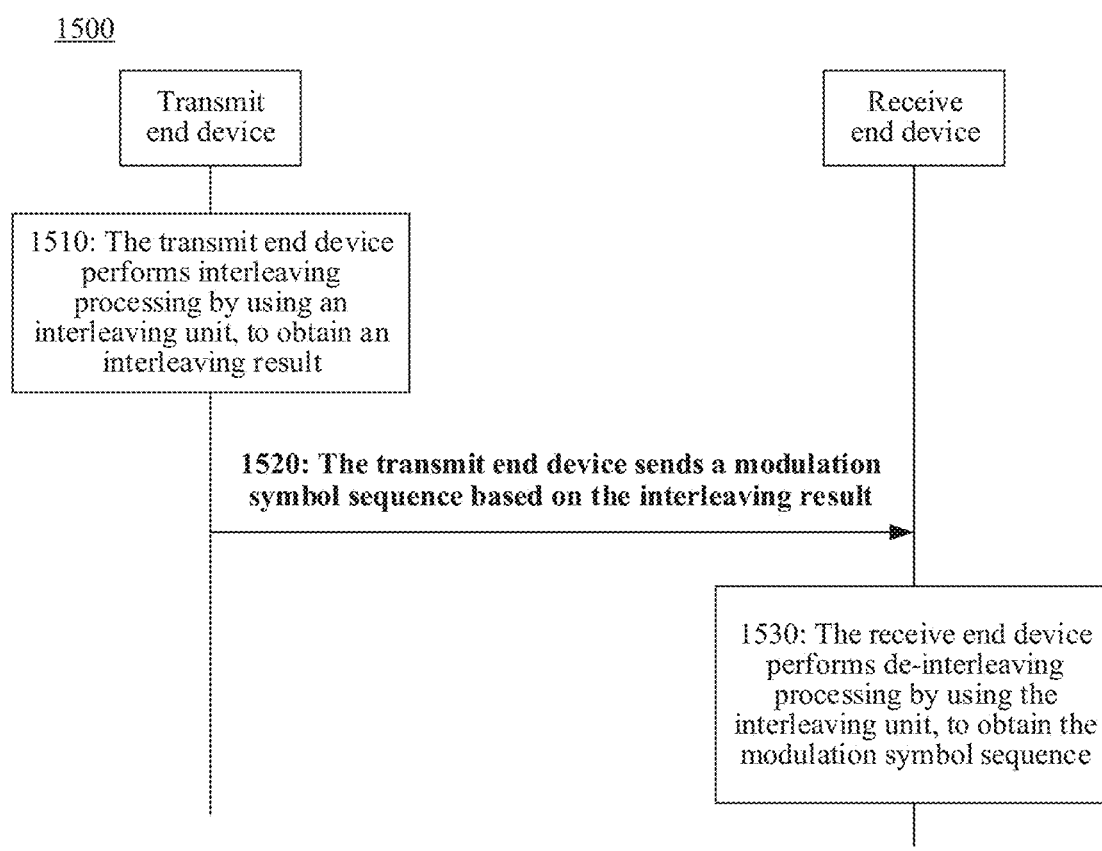
FIG. 15 is a schematic flowchart of an interleaving method according to another embodiment of this application.

FIG. 15 is a schematic flowchart of a data interleaving method according to another embodiment of this application from the perspective of device interaction. The method 1500 shown in FIG. 15 includes the following steps.

1510: A transmit end device performs interleaving processing on a to-be-sent modulation symbol sequence by using an interleaving unit, to obtain an interleaving result, where a size of the interleaving unit is agreed on in a protocol or is determined based on a transmission parameter, and the interleaving unit is a time-frequency resource element group or a modulation symbol group.

1520: The transmit end device sends the modulation symbol sequence based on the interleaving result.

1530: The receive end device performs de-interleaving process on received modulation symbols by using the interleaving unit, to obtain the modulation symbol sequence.

Specifically, in a case, in this embodiment of this application, a size of the time-frequency resource element group may be agreed on in the protocol. To be specific, the size of the interleaving unit is agreed on in the protocol. In this case, the transmit end device may perform interleaving processing based on the interleaving unit specified in the protocol, unlike the prior art in which a CB size is determined through calculation and then interleaving is performed. Similarly, a receive end may also directly perform de-interleaving processing based on the interleaving unit specified in the protocol. Therefore, in this embodiment of this application, interleaving complexity can be reduced, and system performance can be improved.

In this embodiment of this application, the size of the time-frequency resource element group may be agreed on in the protocol. To be specific, the size of the interleaving unit is agreed on in the protocol. In this case, the transmit end device may perform interleaving processing based on the interleaving unit specified in the protocol, unlike the prior art in which a CB size is determined through calculation and then interleaving is performed. Similarly, a receive end may also directly perform de-interleaving processing based on the interleaving unit specified in the protocol. Therefore, in this embodiment of this application, interleaving complexity can be reduced, and system performance can be improved.

In another case,

Both the transmit end device and the receive end device pre-store a correspondence between a plurality of values of the transmission parameter and a plurality of sizes of the time-frequency resource element group. For example, if the transmission parameter is a bandwidth, the correspondence may be shown in Table 1.

The transmit end device and the receive end device may determine, based on the preset correspondence, a size of the time-frequency resource element group that corresponds to a current transmission parameter. For example, when the transmission parameter is a scheduling bandwidth, a transmit end and a receive end may determine, by looking up Table 1 based on a current value of the scheduling bandwidth, for example, a second scheduling bandwidth, that the size of the time-frequency resource group is a second size of the time-frequency resource group.

Specifically, for an interleaving process in FIG. 15, refer to the foregoing description for the interleaving method in the method embodiment in FIG. 4 to FIG. 13B. To avoid repetition, details are not described herein again. Optionally, for the interleaving process in this embodiment of this application, refer to an interleaving process in the prior art. This embodiment of this application is not limited thereto.

Therefore, the transmit end device and the receive end device may flexibly determine, based on the transmission parameter, the size of the time-frequency resource group that corresponds to the transmission parameter, and can determine different sizes of the time-frequency resource group based on different values of the parameter, to meet interleaving requirements in different scenarios, and a prior-art problem of high complexity caused by interleaving performed by using a CB as a unit can be resolved.

The foregoing describes, with reference to FIG. 1 to FIG. 15, the method interaction solutions in the embodiments of this application. The following further describes, with reference to FIG. 16 to FIG. 18, communications apparatuses provided in the embodiments of this application.

Figure 16:
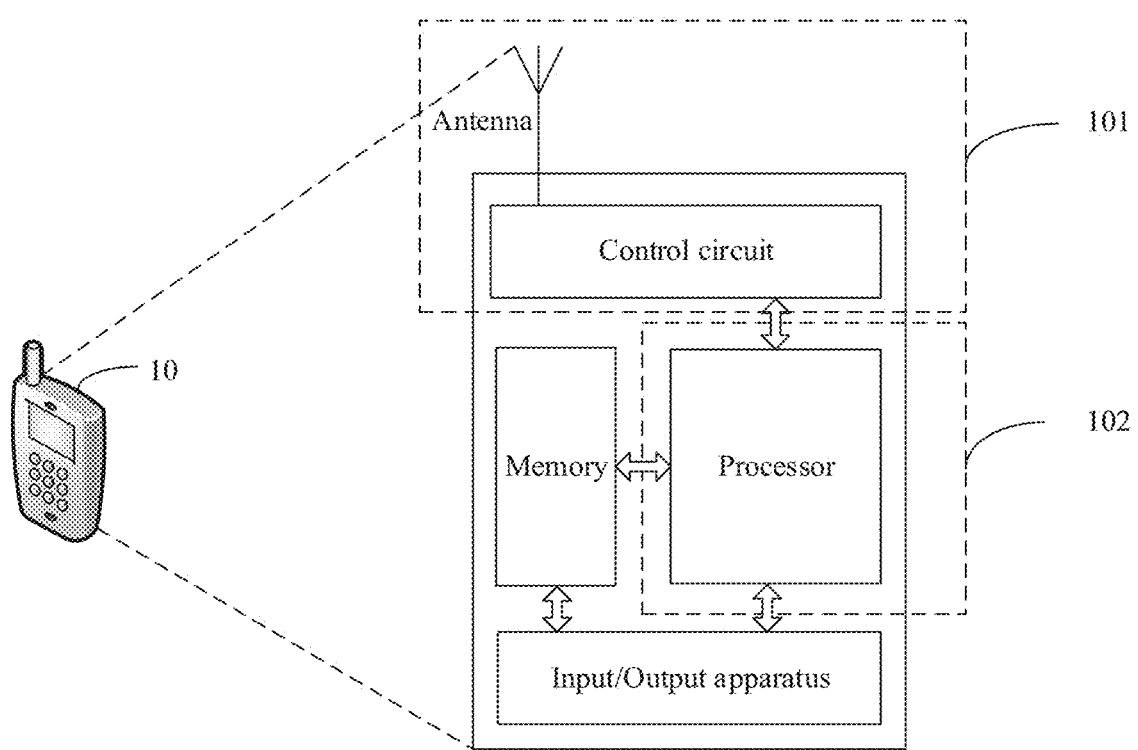
FIG. 16 is a schematic block diagram of a terminal device according to an embodiment of this application.

FIG. 16 is a schematic structural diagram of a terminal device according to an embodiment of this application. The terminal device is applicable to the system shown in FIG. 1. For ease of description, FIG. 16 shows only main components of the terminal device. As shown in FIG. 16, the terminal device 10 includes a processor, a memory, a control circuit, an antenna, and an input/output apparatus. The processor is mainly configured to: process a communication protocol and communication data, control the entire terminal device, execute a software program, and process data of the software program, for example, configured to support the terminal device in performing the actions described in the foregoing method embodiment, for example, performing interleaving processing on a modulation symbol sequence by using a time-frequency resource element group as an interleaving unit during uplink transmission, to obtain an order in which the modulation symbol sequence is mapped onto the plurality of time-frequency resource element groups, and sending the modulation symbol sequence in the order in which the modulation symbol sequence is mapped onto the plurality of time-frequency resource element groups; and performing de-interleaving processing on received modulation symbols by using the time-frequency resource element group as an interleaving unit when downlink data is received, to obtain the modulation symbol sequence. The memory is mainly configured to store the software program and data. The control circuit is mainly configured to perform conversion between a baseband signal and a radio frequency signal and process the radio frequency signal. The control circuit, together with the antenna, may also be referred to as a transceiver that is mainly configured to send and receive a radio frequency signal in an electromagnetic wave form. The input/output apparatus such as a touchscreen, a display, or a keyboard, is mainly configured to: receive data input by a user, and output data to the user.

After the terminal device is powered on, the processor may read a software program in a storage unit, explain and execute an instruction of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 16 shows only one memory and one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data, and the central processing unit is mainly configured to: control the entire terminal device, execute the software program, and process the data of the software program. The processor in FIG. 16 may integrate functions of the baseband processor and the central processing unit. A person skilled in the art may understand that, alternatively, the baseband processor and the central processing unit may be independent processors, and interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of the software program. The processor executes the software program to implement a baseband processing function.

In this embodiment of the present invention, a control circuit and an antenna that has transmitting and receiving functions may be considered as a transceiver unit 101 of the terminal device 10, for example, configured to support the terminal device in performing the transmitting and receiving functions performed by the terminal device in the method embodiments shown in FIG. 1 to FIG. 15. A processor having a processing function is considered as a processing unit 102 of the terminal device 10. As shown in FIG. 16, the terminal device 10 includes the transceiver unit 101 and the processing unit 102. The transceiver unit may also be referred to as a transceiver, a transceiver, a transceiver apparatus, or the like. Optionally, a device configured to implement a receiving function in the transceiver unit 101 may be considered as a receiving unit, and a device configured to implement the transmitting function in the transceiver unit 101 may be considered as a transmitting unit. In other words, the transceiver unit 101 includes the receiving unit and the transmitting unit. The receiving unit may also be referred to as a receiver, an input port, a receiver circuit, or the like. The transmitting unit may be referred to as a transmitter, a transmitter, a transmitter circuit, or the like.

The processor 102 may be configured to execute an instruction stored in the memory, to control the transceiver unit 101 to receive a signal and/or send a signal, to complete a function of the terminal device in the foregoing method embodiments. In an implementation, it may be considered that the function of the transceiver unit 101 is implemented by using a transceiver circuit or a transceiver-dedicated chip.

Figure 17:
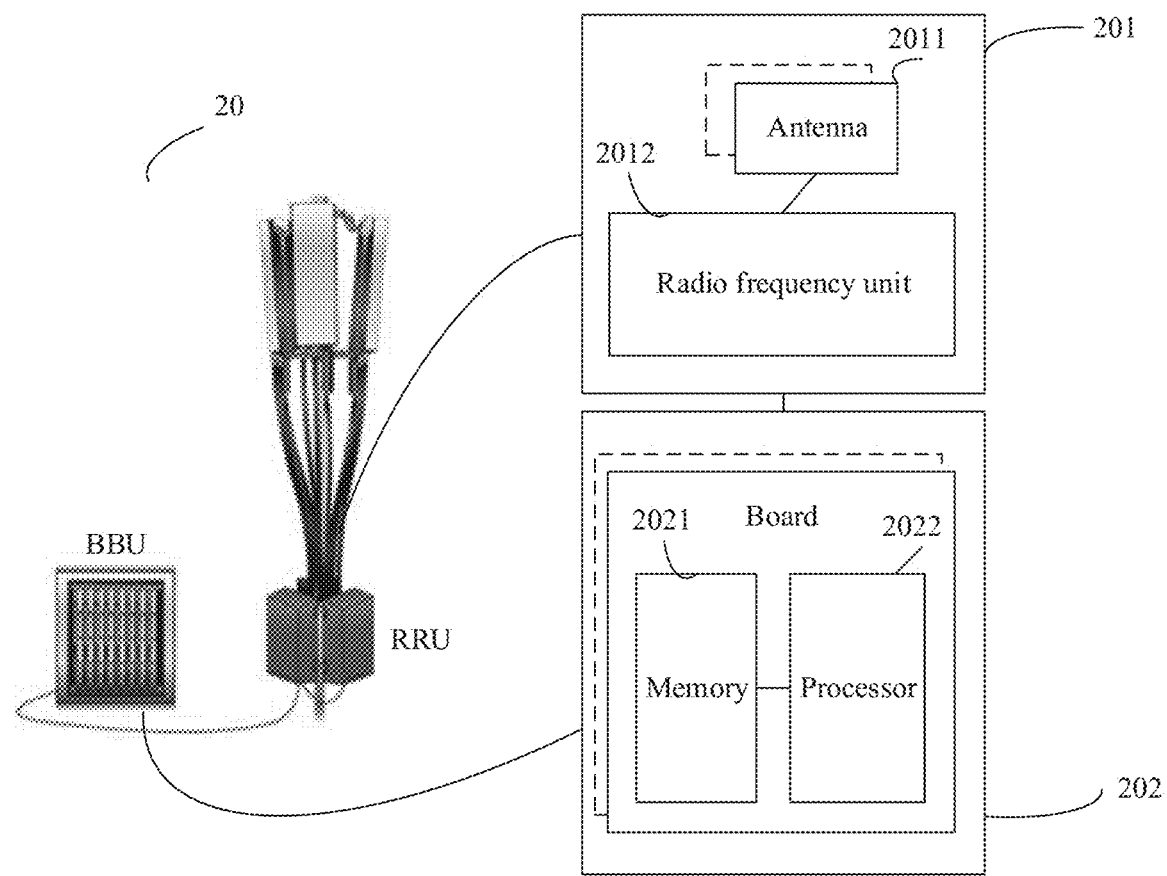
FIG. 17 is a schematic block diagram of a network device according to an embodiment of this application.

FIG. 17 is a schematic structural diagram of a network device according to an embodiment of this application, for example, may be a schematic structural diagram of a base station. As shown in FIG. 17, the base station may be applied to the system shown in FIG. 1, to perform a function of the network device in the foregoing method embodiments. The base station 20 includes one or more radio frequency units such as remote radio units (remote radio unit, RRU) 201 and one or more baseband units (baseband unit, BBU) (which may also be referred to as digital units, digital unit, DU) 202. The RRU 201 may be referred to as a transceiver unit, a transceiver, a transceiver circuit, a transceiver, or the like, and may include at least one antenna 2011 and radio frequency unit 2012. The RRU 201 is mainly configured to: send and receive a radio frequency signal, and perform conversion between the radio frequency signal and a baseband signal, for example, configured to send a modulation symbol to a terminal device. The BBU 202 is mainly configured to perform baseband processing, control the base station, and so on. The RRU 201 and the BBU 202 may be physically disposed together, or may be physically separated, namely, a distributed base station.

The BBU 202 is a control center of the base station, or may be referred to as a processing unit, and is mainly configured to complete baseband processing functions such as channel coding, multiplexing, modulation, and spectrum spreading. For example, the BBU (the processing unit) may be configured to control the base station to perform an operation procedure related to the network device in the foregoing method embodiments.

In an example, the BBU 202 may include one or more boards, and a plurality of boards may jointly support a radio access network (such as an LTE network) having single access standard, or may separately support radio access networks (for example, an LTE network, a 5G network, or another network) having different access standards. The BBU 202 further includes a memory 2021 and a processor 2022. The memory 2021 is configured to store a necessary instruction and data. The processor 2022 is configured to control the base station to perform a necessary action, for example, is configured to control the base station to perform the operation procedure related to the network device in the foregoing method embodiments. The memory 2021 and the processor 2022 may serve the one or more boards. In other words, a memory and a processor may be independently disposed on each board. Alternatively, the plurality of boards may share a same memory and a same processor. In addition, a necessary circuit may be further disposed on each board.

Figure 18:
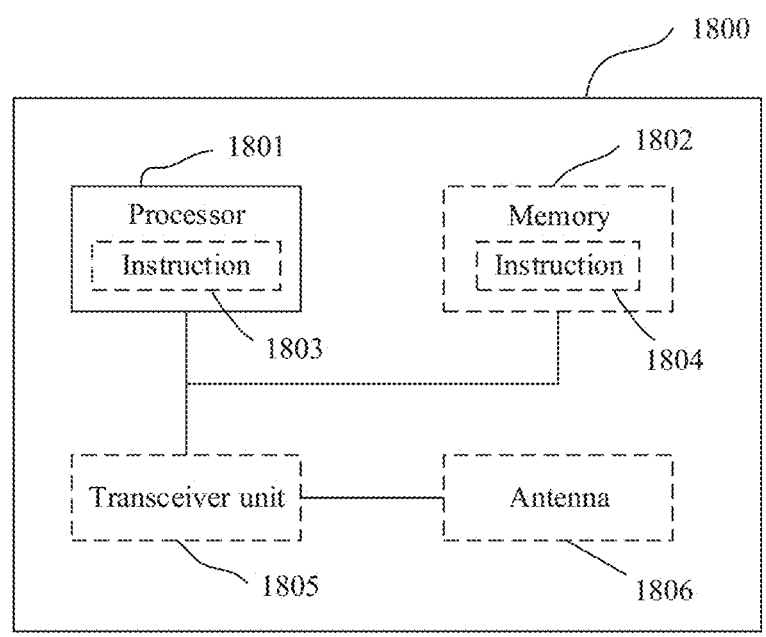
FIG. 18 is a schematic block diagram of a communications apparatus according to an embodiment of this application.

FIG. 18 is a schematic structural diagram of a communications apparatus 1800. The apparatus 1800 may be configured to implement the methods described in the foregoing method embodiments. Refer to the descriptions in the foregoing method embodiments. The communications apparatus 1800 may be a chip, a network device (for example, a base station), a terminal device, or the like.

The communications apparatus 1800 includes one or more processors 1801. The processor 1801 may be a general purpose processor, a dedicated processor, or the like. It should be understood that when the processor 1801 is a dedicated processor, an instruction may not be required, and an integrated logic circuit of hardware in the processor completes the methods in the foregoing embodiments. For example, the processor may be an application-specific integrated circuit (ASIC) or the like.

Optionally, the processor 1801 may alternatively be, for example, a general purpose processor. In this case, the communications apparatus 1800 may include one or more memories 1802. The memory stores an instruction 1804, and the instruction may be run on the processor, so that the communications apparatus 1800 performs the methods described in the foregoing method embodiments. Optionally, the memory may further store data. Optionally, the processor may further store an instruction and/or data. The processor and the memory may be disposed separately, or may be integrated together. For example, the processor includes a central processing unit (central processing unit, CPU), a network processor (network processor, NP), a microprocessor, and the like. Optionally, the processor may alternatively be a digital signal processor (DSP), a field programmable gate array (FPGA), another programmable logic device, a discrete gate or a transistor logic device, a discrete hardware component, any conventional processor, or the like. This embodiment of this application is not limited thereto.

Specifically, the processor 1801 may be a baseband processor or a central processing unit. The baseband processor may be configured to process a communication protocol and communication data, and the central processing unit may be configured to: control the communications apparatus (for example, the base station, the terminal, or the chip), execute a software program, and process data of the software program. The communications apparatus may include a transceiver unit, configured to input (receive) and output (send) a signal. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 1800 includes the one or more processors 1801. The one or more processors 1801 may implement the methods performed by the network device or the terminal device in the embodiments shown in FIG. 1 and FIG. 15.

In a possible design, the communications apparatus 1800 includes a means (means) that obtains modulation symbols, a means (means) that is configured to perform interleaving processing on the modulation symbols, and a means (means) that is configured to send the interleaved modulation symbols. Functions of performing interleaving processing on the modulation symbols and sending the interleaved modulation symbols may be implemented by using the one or more processors. For example, by using one or more processors, the modulation symbols may be obtained and interleaving processing may be performed on the modulation symbols. The interleaved modulation symbols are sent by using a transceiver, an input/output circuit, or an interface of a chip. For details about an interleaving method and process, refer to related descriptions in the foregoing method embodiments.

In a possible design, the communications apparatus 1800 includes a means (means) configured to receive modulation symbols and a means (means) configured to de-interleave the modulation symbols. For example, the modulation symbols may be received by using the transceiver, the input/output circuit, or the interface of the chip, and the modulation symbols are de-interleaved by using the one or more processors.

Optionally, in addition to the methods in the embodiments shown in FIG. 1 and FIG. 15, the processor 1801 may further implement another function.

Optionally, in a design, the processor 1801 may be general purpose processor. The processor 1801 may include an instruction 1803. The instruction may be run on the processor, so that the communications apparatus 1800 performs the method described in the foregoing method embodiments.

In another possible design, the communications apparatus 1800 may further include a circuit. The circuit may implement a function in the foregoing method embodiments.

In another possible design, the communications apparatus 1800 may further include a transceiver unit 1805 and an antenna 1806. The processor 1801 may be referred to as a processing unit, and controls the communications apparatus (the terminal device or the network device). The transceiver unit 1805 may be referred to as a transceiver, a transceiver circuit, a transceiver, or the like, and is configured to implement a transmitting and receiving function of the communications apparatus by using the antenna 1806.

An embodiment of this application further provides a communications system, including the foregoing network device and terminal device.

It should be understood that in the embodiments of this application described above, the processor may be a CPU, or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

A memory may include a read-only memory and a random access memory, and provide an instruction and data to the processor. A part of the memory may further include a non-volatile random access memory.

A bus system may further include a power bus, a control bus, a status signal bus, and the like, in addition to a data bus. However, for clear description, various types of buses in the figure are marked as the bus system.

In an implementation process, steps in the foregoing methods can be implemented by using an integrated logical circuit of hardware in the processor, or by using instructions in a form of software. The steps of the method disclosed with reference to the embodiments of this application may be directly performed by a hardware processor, or may be performed by using a combination of the hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be further understood that "first", "second", "third", "fourth", and various numerical symbols in this specification are merely used for differentiation for ease of description, and are not construed as a limitation on the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, various illustrative logical blocks (illustrative logical block) and steps (step) that are described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions (programs). When the computer program instructions (programs) are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

Described implementations of the subject matter can include one or more features, alone or in combination.

For example, in a first implementation, a computer-implemented data transmission method, comprising: obtaining, by a transmit end device, a to-be-transmitted modulation symbol sequence in a plurality of time-frequency resource element groups, wherein the time-frequency resource element group comprises N time-frequency resource elements. N is an integer greater than or equal to 2, the time-frequency resource element comprises at least one resource element RE, one time-frequency resource element is used to carry one modulation symbol group, one modulation symbol group comprises at least one modulation symbol, and a size of the time-frequency resource element group is agreed on in a protocol, or a size of the time-frequency resource element group is determined based on a transmission parameter; performing, by the transmit end device, interleaving processing on the modulation symbol sequence by using the time-frequency resource element group as an interleaving unit, to obtain an order in which the modulation symbol sequence is mapped onto the plurality of time-frequency resource element groups, wherein a plurality of consecutive modulation symbol groups in the modulation symbol sequence are mapped onto at least two of the plurality of time-frequency resource element groups; and sending, by the transmit end device, the modulation symbol sequence in the order in which the modulation symbol sequence is mapped onto the plurality of time-frequency resource element groups.

In a second implementation, a computer-implemented data transmission method, comprising: receiving, by a receive end device, modulation symbols transmitted by using a plurality of time-frequency resource element groups, wherein the modulation symbols are mapped onto the plurality of time-frequency resource element groups in an order obtained after interleaving processing is performed on a modulation symbol sequence by using the time-frequency resource element group as an interleaving unit, the time-frequency resource element group comprises N time-frequency resource elements, N is an integer greater than or equal to 2, the time-frequency resource element comprises at least one resource element RE, one time-frequency resource element is used to carry one modulation symbol group, one modulation symbol group comprises at least one modulation symbol, and a size of the time-frequency resource element group is agreed on in a protocol, or a size of the time-frequency resource element group is determined based on a transmission parameter; and performing, by the receive end device by using the time-frequency resource element group as an interleaving unit, de-interleaving processing on the modulation symbols transmitted by using the plurality of time-frequency resource element groups, to obtain the modulation symbol sequence.

The foregoing and other described implementations can each, optionally, include one or more of the following features:

A first feature, combinable with any of the following features, wherein the modulation symbol sequence comprises a modulation symbol of a data transport block and a modulation symbol of a reference signal comprised in a scheduling resource corresponding to the data transport block, and the time-frequency resource element group is a physical time-frequency resource element group.

A second feature, combinable with any of the previous or following features, wherein the modulation symbol sequence comprises only a modulation symbol of a data transport block, the time-frequency resource element group is a logical time-frequency resource element group, and the logical time-frequency resource element group comprises a time-frequency resource element that is of a physical time-frequency resource and that is configured to carry only the modulation symbol of the data transport block, wherein the physical time-frequency resource comprises the time-frequency resource element used to carry the modulation symbol of the data transport block and a time-frequency resource element used to carry a modulation symbol of a reference signal comprised in a scheduling resource corresponding to the data transport block.

A third feature, combinable with any of the previous or following features, wherein the modulation symbol sequence comprises a first modulation symbol sequence and a second modulation symbol sequence, the plurality of time-frequency resource element groups comprise a first time-frequency resource element group set and a second time-frequency resource element group set, the first time-frequency resource element group set is used to carry the first modulation symbol sequence, the second time-frequency resource element group set is used to carry the second modulation symbol sequence, the first time-frequency resource element group set comprises at least two first time-frequency resource element groups, the first time-frequency resource element group comprises N1 first time-frequency resource elements, N1 is an integer greater than or equal to 2, the second time-frequency resource element group set comprises at least two second time-frequency resource element groups, the second time-frequency resource element group comprises N2 second time-frequency resource elements, N2 is an integer greater than or equal to 2, one first time-frequency resource element is used to carry one first modulation symbol group, and one second time-frequency resource element is used to carry one second modulation symbol group, wherein a quantity of resource elements REs comprised in the first time-frequency resource element is different from that of resource elements REs comprised in the second time-frequency resource element; and the performing, by the transmit end device, interleaving processing on the modulation symbol sequence by using the time-frequency resource element group as an interleaving unit, to obtain an order in which the modulation symbol sequence is mapped onto the plurality of time-frequency resource element groups comprises: performing, by the transmit end device, interleaving processing on the first modulation symbol sequence by using the first time-frequency resource element group as an interleaving unit, and performing interleaving processing on the second modulation symbol sequence by using the second time-frequency resource element group as an interleaving unit, to obtain a first order in which the first modulation symbol sequence is mapped onto the first time-frequency resource element group set and a second order in which the second modulation symbol sequence is mapped onto the second time-frequency resource element group set, wherein a plurality of consecutive first modulation symbol groups in the first modulation symbol sequence are mapped onto the at least two first time-frequency resource element groups in the first time-frequency resource element group set, and a plurality of consecutive second modulation symbol groups in the second modulation symbol sequence are mapped onto the at least two second time-frequency resource element groups in the second time-frequency resource element group set.

A fourth feature, combinable with any of the previous or following features, wherein the size of the time-frequency resource element group is determined based on the transmission parameter, wherein the transmission parameter comprises at least one of the following parameters: a scheduling bandwidth, a delay spread, and a moving speed of a terminal device; and before the transmit end device performs interleaving processing on the modulation symbols in the plurality of time-frequency resource element groups in a first order in which the modulation symbol of the data transport block is mapped onto the plurality of time-frequency resource element groups, the method further comprises: determining, by the transmit end device based on a preset correspondence between the transmission parameter and the size of the time-frequency resource element group, a size of the time-frequency resource element group that corresponds to a current transmission parameter.

A fifth feature, combinable with any of the previous or following features, wherein the size of the time-frequency resource element group is determined based on the transmission parameter, wherein the transmission parameter comprises at least one of the following parameters: a scheduling bandwidth, a delay spread, and a moving speed of a terminal device; and before the performing, by the receive end device by using the time-frequency resource element group as an interleaving unit, de-interleaving processing on the modulation symbols transmitted by using the plurality of time-frequency resource element groups, the method further comprises: determining, by the receive end device based on a preset correspondence between the transmission parameter and the size of the time-frequency resource element group, a size of the time-frequency resource element group that corresponds to a current transmission parameter.

A sixth feature, combinable with any of the previous or following features, wherein the size of the time-frequency resource element group is determined based on the transmission parameter, wherein the transmission parameter comprises at least one of the following parameters: the scheduling bandwidth, the delay spread, and the moving speed of the terminal device; and the transmit end device is a network device, the receive end device is a terminal device, and before the performing, by the transmit end device, interleaving processing on the modulation symbol sequence, the method further comprises: determining, by the transmit end device, the size of the time-frequency resource element group based on the transmission parameter; and sending, by the transmit end device, interleaving indication information to the receive end device, wherein the interleaving indication information indicates the size of the time-frequency resource group; or the transmit end device is a terminal device, the receive end device is a network device, and before the performing, by the transmit end device, interleaving processing on the modulation symbol sequence, the method further comprises: receiving, by the transmit end device, interleaving indication information sent by the receive end device, wherein the interleaving indication information indicates the size of the time-frequency resource group.

A seventh feature, combinable with any of the previous or following features, wherein the size of the time-frequency resource element group is determined based on the transmission parameter, wherein the transmission parameter comprises at least one of the following parameters: the scheduling bandwidth, the delay spread, and the moving speed of the terminal device; and the receive end device is a network device, the transmit end device is a terminal device, and before the receiving, by a receive end device, modulation symbols transmitted by using a plurality of time-frequency resource element groups, the method further comprises: determining, by the receive end device, the size of the time-frequency resource element group based on the transmission parameter; and sending, by the receive end device, interleaving indication information to the transmit end device, wherein the interleaving indication information indicates the size of the time-frequency resource group; or the receive end device is a terminal device, the transmit end device is a network device, and before the performing, by the receive end device by using the time-frequency resource element group as an interleaving unit, de-interleaving processing on the modulation symbols transmitted by using the plurality of time-frequency resource element groups, the method further comprises: receiving, by the receive end device, interleaving indication information sent by the transmit end device, wherein the interleaving indication information indicates the size of the time-frequency resource group.

An eight feature, combinable with any of the previous or following features, wherein the interleaving indication information is sent by using radio resource control RRC signaling, a media access control-control element MAC-CE, or downlink control information DCI.

A ninth feature, combinable with any of the previous or following features, wherein the plurality of time-frequency resource element groups comprise all or some frequency domain resources on at least one orthogonal frequency division multiplexing OFDM symbol.

In a third implementation, a transmit end device, comprising: a processing unit, configured to: obtain a to-be-transmitted modulation symbol sequence in a plurality of time-frequency resource element groups, wherein the time-frequency resource element group comprises N time-frequency resource elements. N is an integer greater than or equal to 2, the time-frequency resource element comprises at least one resource element RE, one time-frequency resource element is used to carry one modulation symbol group, one modulation symbol group comprises at least one modulation symbol, and a size of the time-frequency resource element group is agreed on in a protocol, or a size of the time-frequency resource element group is determined based on a transmission parameter; and perform interleaving processing on the modulation symbol sequence by using the time-frequency resource element group as an interleaving unit, to obtain an order in which the modulation symbol sequence is mapped onto the plurality of time-frequency resource element groups, wherein a plurality of consecutive modulation symbol groups in the modulation symbol sequence are mapped onto at least two of the plurality of time-frequency resource element groups; and a transceiver unit, configured to send the modulation symbol sequence in the order in which the modulation symbol sequence is mapped onto the plurality of time-frequency resource element groups.

In a forth implementation, a receive end device, comprising: a transceiver unit, configured to receive modulation symbols transmitted by using a plurality of time-frequency resource element groups, wherein the modulation symbols are mapped onto the plurality of time-frequency resource element groups in an order obtained after interleaving processing is performed on a modulation symbol sequence by using the time-frequency resource element group as an interleaving unit, the time-frequency resource element group comprises N time-frequency resource elements, N is an integer greater than or equal to 2, the time-frequency resource element comprises at least one resource element RE, one time-frequency resource element is used to carry one modulation symbol group, one modulation symbol group comprises at least one modulation symbol, and a size of the time-frequency resource element group is agreed on in a protocol, or a size of the time-frequency resource element group is determined based on a transmission parameter; and a processing unit, configured to perform, by using the time-frequency resource element group as an interleaving unit, de-interleaving processing on the modulation symbols transmitted by using the plurality of time-frequency resource element groups, to obtain the modulation symbol sequence.

The foregoing and other described implementations can each, optionally, include one or more of the following features:

A first feature, combinable with any of the following features, wherein the modulation symbol sequence comprises a modulation symbol of a data transport block and a modulation symbol of a reference signal comprised in a scheduling resource corresponding to the data transport block, and the time-frequency resource element group is a physical time-frequency resource element group.

A second feature, combinable with any of the following features, wherein the modulation symbol sequence comprises only a modulation symbol of a data transport block, the time-frequency resource element group is a logical time-frequency resource element group, and the logical time-frequency resource element group comprises a time-frequency resource element that is of a physical time-frequency resource and that is configured to carry only the modulation symbol of the data transport block, wherein the physical time-frequency resource comprises the time-frequency resource element used to carry the modulation symbol of the data transport block and a time-frequency resource element used to carry a modulation symbol of a reference signal comprised in a scheduling resource corresponding to the data transport block.

A third feature, combinable with any of the following features, wherein the modulation symbol sequence comprises a first modulation symbol sequence and a second modulation symbol sequence, the plurality of time-frequency resource element groups comprise a first time-frequency resource element group set and a second time-frequency resource element group set, the first time-frequency resource element group set is used to carry the first modulation symbol sequence, the second time-frequency resource element group set is used to carry the second modulation symbol sequence, the first time-frequency resource element group set comprises at least two first time-frequency resource element groups, the first time-frequency resource element group comprises N1 first time-frequency resource elements, N1 is an integer greater than or equal to 2, the second time-frequency resource element group set comprises at least two second time-frequency resource element groups, the second time-frequency resource element group comprises N2 second time-frequency resource elements, N2 is an integer greater than or equal to 2, one first time-frequency resource element is used to carry one first modulation symbol group, and one second time-frequency resource element is used to carry one second modulation symbol group, wherein a quantity of resource elements REs comprised in the first time-frequency resource element is different from that of resource elements REs comprised in the second time-frequency resource element, wherein the processing unit is specifically configured to: perform interleaving processing on the first modulation symbol sequence by using the first time-frequency resource element group as an interleaving unit, and perform interleaving processing on the second modulation symbol sequence by using the second time-frequency resource element group as an interleaving unit, to obtain a first order in which the first modulation symbol sequence is mapped onto the first time-frequency resource element group set and a second order in which the second modulation symbol sequence is mapped onto the second time-frequency resource element group set, wherein a plurality of consecutive first modulation symbol groups in the first modulation symbol sequence are mapped onto the at least two first time-frequency resource element groups in the first time-frequency resource element group set, and a plurality of consecutive second modulation symbol groups in the second modulation symbol sequence are mapped onto the at least two second time-frequency resource element groups in the second time-frequency resource element group set.

A fourth feature, combinable with any of the following features, wherein the size of the time-frequency resource element group is determined based on the transmission parameter, wherein the transmission parameter comprises at least one of the following parameters: a scheduling bandwidth, a delay spread, and a moving speed of a terminal device, wherein the processing unit is further configured to: before the transceiver unit performs interleaving processing on the modulation symbols in the plurality of time-frequency resource element groups in a first order in which the modulation symbol of the data transport block is mapped onto the plurality of time-frequency resource element groups, determine, based on a preset correspondence between the transmission parameter and the size of the time-frequency resource element group, a size of the time-frequency resource element group that corresponds to a current transmission parameter.

A fifth feature, combinable with any of the following features, wherein the size of the time-frequency resource element group is determined based on the transmission parameter, wherein the transmission parameter comprises at least one of the following parameters: a scheduling bandwidth, a delay spread, and a moving speed of a terminal device, wherein before performing, by using the time-frequency resource element group as an interleaving unit, de-interleaving processing on the modulation symbols transmitted by using the plurality of time-frequency resource element groups, the processing unit is further configured to determine, based on a preset correspondence between the transmission parameter and the size of the time-frequency resource element group, a size of the time-frequency resource element group that corresponds to a current transmission parameter.

A sixth feature, combinable with any of the following features, wherein the size of the time-frequency resource element group is determined based on the transmission parameter, wherein the transmission parameter comprises at least one of the following parameters: the scheduling bandwidth, the delay spread, and the moving speed of the terminal device; and the transmit end device is a network device, the receive end device is a terminal device, and before the processing unit performs interleaving processing on the modulation symbol sequence, the processing unit is further configured to determine the size of the time-frequency resource element group based on the transmission parameter; and the transceiver unit is further configured to send interleaving indication information to the receive end device, wherein the interleaving indication information indicates the size of the time-frequency resource group; or the transmit end device is a terminal device, the receive end device is a network device, and before the processing unit performs interleaving processing on the modulation symbol sequence, the transceiver unit is further configured to receive interleaving indication information sent by the receive end device, wherein the interleaving indication information indicates the size of the time-frequency resource group.

A seventh feature, combinable with any of the following features, wherein the size of the time-frequency resource element group is determined based on the transmission parameter, wherein the transmission parameter comprises at least one of the following parameters: the scheduling bandwidth, the delay spread, and the moving speed of the terminal device; and the receive end device is a network device, the transmit end device is a terminal device, and before the transceiver unit receives the modulation symbols transmitted by using the plurality of time-frequency resource element groups, the processing unit is further configured to determine the size of the time-frequency resource element group based on the transmission parameter; and the transceiver unit sends interleaving indication information to the transmit end device, wherein the interleaving indication information indicates the size of the time-frequency resource group; or the receive end device is a terminal device, the transmit end device is a network device, and before the processing unit performs, by using the time-frequency resource element group as an interleaving unit, de-interleaving processing on the modulation symbols transmitted by using the plurality of time-frequency resource element groups, the transceiver unit is further configured receive interleaving indication information sent by the transmit end device, wherein the interleaving indication information indicates the size of the time-frequency resource group.

An eight feature, combinable with any of the following features, wherein the interleaving indication information is sent by using radio resource control RRC signaling, a media access control-control element MAC-CE, or downlink control information DCI.

A ninth feature, combinable with any of the following features, wherein the plurality of time-frequency resource element groups comprise all or some frequency domain resources on at least one orthogonal frequency division multiplexing OFDM symbol.

In a fourth implementation, a transmit end device, comprising: a processor and a transceiver, wherein the processor is configured to obtain a to-be-transmitted modulation symbol sequence in a plurality of time-frequency resource element groups, wherein the time-frequency resource element group comprises N time-frequency resource elements, N is an integer greater than or equal to 2, the time-frequency resource element comprises at least one resource element RE, one time-frequency resource element is used to carry one modulation symbol group, one modulation symbol group comprises at least one modulation symbol, and a size of the time-frequency resource element group is agreed on in a protocol, or a size of the time-frequency resource element group is determined based on a transmission parameter; the processor is further configured to perform interleaving processing on the modulation symbol sequence by using the time-frequency resource element group as an interleaving unit, to obtain an order in which the modulation symbol sequence is mapped onto the plurality of time-frequency resource element groups, wherein a plurality of consecutive modulation symbol groups in the modulation symbol sequence are mapped onto at least two of the plurality of time-frequency resource element groups; and the transceiver is configured to send the modulation symbol sequence in the order in which the modulation symbol sequence is mapped onto the plurality of time-frequency resource element groups.

In a fifth implementation, a receive end device, comprising: a processor and a transceiver, wherein the transceiver is configured to receive modulation symbols transmitted by using a plurality of time-frequency resource element groups, wherein the modulation symbols are mapped onto the plurality of time-frequency resource element groups in an order obtained after interleaving processing is performed on a modulation symbol sequence by using the time-frequency resource element group as an interleaving unit, the time-frequency resource element group comprises N time-frequency resource elements, N is an integer greater than or equal to 2, the time-frequency resource element comprises at least one resource element RE, one time-frequency resource element is used to carry one modulation symbol group, one modulation symbol group comprises at least one modulation symbol, and a size of the time-frequency resource element group is agreed on in a protocol, or a size of the time-frequency resource element group is determined based on a transmission parameter; and the processor is configured to perform, by using the time-frequency resource element group as an interleaving unit, de-interleaving processing on the modulation symbols transmitted by using the plurality of time-frequency resource element groups, to obtain the modulation symbol sequence.

The foregoing and other described implementations can each, optionally, include one or more of the following features:

A first feature, combinable with any of the following features, wherein the modulation symbol sequence comprises a modulation symbol of a data transport block and a modulation symbol of a reference signal comprised in a scheduling resource corresponding to the data transport block, and the time-frequency resource element group is a physical time-frequency resource element group.

A second feature, combinable with any of the following features, wherein the modulation symbol sequence comprises only a modulation symbol of a data transport block, the time-frequency resource element group is a logical time-frequency resource element group, and the logical time-frequency resource element group comprises a time-frequency resource element that is of a physical time-frequency resource and that is configured to carry only the modulation symbol of the data transport block, wherein the physical time-frequency resource comprises the time-frequency resource element used to carry the modulation symbol of the data transport block and a time-frequency resource element used to carry a modulation symbol of a reference signal comprised in a scheduling resource corresponding to the data transport block.

A third feature, combinable with any of the following features, wherein the modulation symbol sequence comprises a first modulation symbol sequence and a second modulation symbol sequence, the plurality of time-frequency resource element groups comprise a first time-frequency resource element group set and a second time-frequency resource element group set, the first time-frequency resource element group set is used to carry the first modulation symbol sequence, the second time-frequency resource element group set is used to carry the second modulation symbol sequence, the first time-frequency resource element group set comprises at least two first time-frequency resource element groups, the first time-frequency resource element group comprises N1 first time-frequency resource elements, N1 is an integer greater than or equal to 2, the second time-frequency resource element group set comprises at least two second time-frequency resource element groups, the second time-frequency resource element group comprises N2 second time-frequency resource elements, N2 is an integer greater than or equal to 2, one first time-frequency resource element is used to carry one first modulation symbol group, and one second time-frequency resource element is used to carry one second modulation symbol group, wherein a quantity of resource elements REs comprised in the first time-frequency resource element is different from that of resource elements REs comprised in the second time-frequency resource element, wherein the processor is specifically configured to: perform interleaving processing on the first modulation symbol sequence by using the first time-frequency resource element group as an interleaving unit, and perform interleaving processing on the second modulation symbol sequence by using the second time-frequency resource element group as an interleaving unit, to obtain a first order in which the first modulation symbol sequence is mapped onto the first time-frequency resource element group set and a second order in which the second modulation symbol sequence is mapped onto the second time-frequency resource element group set, wherein a plurality of consecutive first modulation symbol groups in the first modulation symbol sequence are mapped onto the at least two first time-frequency resource element groups in the first time-frequency resource element group set, and a plurality of consecutive second modulation symbol groups in the second modulation symbol sequence are mapped onto the at least two second time-frequency resource element groups in the second time-frequency resource element group set.

A fourth feature, combinable with any of the following features, wherein the size of the time-frequency resource element group is determined based on the transmission parameter, wherein the transmission parameter comprises at least one of the following parameters: a scheduling bandwidth, a delay spread, and a moving speed of a terminal device, wherein the processor is further configured to: before the transceiver performs interleaving processing on the modulation symbols in the plurality of time-frequency resource element groups in a first order in which the modulation symbol of the data transport block is mapped onto the plurality of time-frequency resource element groups, determine, based on a preset correspondence between the transmission parameter and the size of the time-frequency resource element group, a size of the time-frequency resource element group that corresponds to a current transmission parameter.

A fifth feature, combinable with any of the following features, wherein the size of the time-frequency resource element group is determined based on the transmission parameter, wherein the transmission parameter comprises at least one of the following parameters: a scheduling bandwidth, a delay spread, and a moving speed of a terminal device, wherein before performing, by using the time-frequency resource element group as an interleaving unit, de-interleaving processing on the modulation symbols transmitted by using the plurality of time-frequency resource element groups, the processor is further configured to determine, based on a preset correspondence between the transmission parameter and the size of the time-frequency resource element group, a size of the time-frequency resource element group that corresponds to a current transmission parameter.

A sixth feature, combinable with any of the following features, wherein the size of the time-frequency resource element group is determined based on the transmission parameter, wherein the transmission parameter comprises at least one of the following parameters: the scheduling bandwidth, the delay spread, and the moving speed of the terminal device; and the transmit end device is a network device, the receive end device is a terminal device, and before the processor performs interleaving processing on the modulation symbol sequence, the processor is further configured to determine the size of the time-frequency resource element group based on the transmission parameter; and the transceiver is further configured to send interleaving indication information to the receive end device, wherein the interleaving indication information indicates the size of the time-frequency resource group; or the transmit end device is a terminal device, the receive end device is a network device, and before the processor performs interleaving processing on the modulation symbol sequence, the transceiver is further configured to receive interleaving indication information sent by the receive end device, wherein the interleaving indication information indicates the size of the time-frequency resource group.

A seventh feature, combinable with any of the following features, wherein the size of the time-frequency resource element group is determined based on the transmission parameter, wherein the transmission parameter comprises at least one of the following parameters: the scheduling bandwidth, the delay spread, and the moving speed of the terminal device; and the receive end device is a network device, the transmit end device is a terminal device, and before the transceiver receives the modulation symbols transmitted by using the plurality of time-frequency resource element groups, the processor is further configured to determine the size of the time-frequency resource element group based on the transmission parameter; and the transceiver sends interleaving indication information to the transmit end device, wherein the interleaving indication information indicates the size of the time-frequency resource group; or the receive end device is a terminal device, the transmit end device is a network device, and before the processor performs, by using the time-frequency resource element group as an interleaving unit, de-interleaving processing on the modulation symbols transmitted by using the plurality of time-frequency resource element groups, the transceiver is further configured receive interleaving indication information sent by the transmit end device, wherein the interleaving indication information indicates the size of the time-frequency resource group.

An eight feature, combinable with any of the following features, wherein the interleaving indication information is sent by using radio resource control RRC signaling, a media access control-control element MAC-CE, or downlink control information DCI.

A ninth feature, combinable with any of the following features, wherein the plurality of time-frequency resource element groups comprise all or some frequency domain resources on at least one orthogonal frequency division multiplexing OFDM symbol.

In some implementations, these general and specific aspects may be implemented using a system, a processing apparatus, a computer-readable storage medium, a computer program product, or any combination thereof. For example, the processing apparatus comprises one or more of a processor, an interface, or a memory, wherein the memory stores code, the memory is disposed in the processor: or the memory and the processor are independently disposed.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
obtaining, by a transmit end device, a modulation symbol sequence in a plurality of time-frequency resource element groups, wherein the plurality of time-frequency resource element groups comprises N time-frequency resource elements, N is an integer greater than or equal to 2, one time-frequency resource element of the N time-frequency resource elements comprises at least one resource element (RE), the time-frequency resource element of the N time-frequency resource elements is used to carry one modulation symbol group, the one modulation symbol group comprises at least one modulation symbol, and a size of a time-frequency resource element group of the plurality of time-frequency resource element groups is agreed on in a protocol, or the size of the time-frequency resource element group is determined based on a transmission parameter;

performing, by the transmit end device, interleaving processing on the modulation symbol sequence using the time-frequency resource element group as an interleaving unit to obtain an order in which the modulation symbol sequence is mapped onto the plurality of time-frequency resource element groups, wherein a plurality of consecutive modulation symbol groups in the modulation symbol sequence are mapped onto at least two of the plurality of time-frequency resource element groups; and sending, by the transmit end device to a receive end device, the modulation symbol sequence in the order in which the modulation symbol sequence is mapped onto the plurality of time-frequency resource element groups.

2. The data transmission method according to claim 1, wherein:

the modulation symbol sequence comprises a modulation symbol of a data transport block and a modulation symbol of a reference signal comprised in a scheduling resource corresponding to the data transport block, and the time-frequency resource element group is a physical time-frequency resource element group.

3. The data transmission method according to claim 1, wherein:

the modulation symbol sequence comprises only a modulation symbol of a data transport block, the time-frequency resource element group is a logical time-frequency resource element group, and the logical time-frequency resource element group comprises a time-frequency resource element that is of a physical time-frequency resource and that is configured to carry only the modulation symbol of the data transport block, wherein the physical time-frequency resource comprises the time-frequency resource element used to carry the modulation symbol of the data transport block and a time-frequency resource element used to carry a modulation symbol of a reference signal comprised in a scheduling resource corresponding to the data transport block.

4. The data transmission method according to claim 1, wherein:

the modulation symbol sequence comprises a first modulation symbol sequence and a second modulation symbol sequence, the plurality of time-frequency resource element groups comprise a first time-frequency resource element group set and a second time-frequency resource element group set, the first time-frequency resource element group set is used to carry the first modulation symbol sequence, the second time-frequency resource element group set is used to carry the second modulation symbol sequence, the first time-frequency resource element group set comprises at least two first time-frequency resource element groups, the first time-frequency resource element group comprises $N_1$ first time-frequency resource elements, $N_1$ is an integer greater than or equal to 2, the second time-frequency resource element group set comprises at least two second time-frequency resource element groups, the second time-frequency resource element group comprises $N_2$ second time-frequency resource elements, $N_2$ is an integer greater than or equal to 2, one first time-frequency resource element is used to carry one first modulation symbol group, and one second time-frequency resource element is used to carry one second modulation symbol group, wherein a quantity of resource elements (REs) comprised in the first time-frequency resource element is different from that of resource elements (REs) comprised in the second time-frequency resource element, and the performing, by the transmit end device, interleaving processing on the modulation symbol sequence using the time-frequency resource element group as an interleaving unit to obtain an order in which the modulation symbol sequence is mapped onto the plurality of time-frequency resource element groups comprises:

performing, by the transmit end device, interleaving processing on the first modulation symbol sequence using the first time-frequency resource element group as an interleaving unit to obtain a first order in which the first modulation symbol sequence is mapped onto the first time-frequency resource element group set; and performing interleaving processing on the second modulation symbol sequence using the second time-frequency resource element group as an interleaving unit to obtain a second order in which the second modulation symbol sequence is mapped onto the second time-frequency resource element group set, wherein a plurality of consecutive first modulation symbol groups in the first modulation symbol sequence are mapped onto the at least two first time-frequency resource element groups in the first time-frequency resource element group set, and a plurality of consecutive second modulation symbol groups in the second modulation symbol sequence are mapped onto the at least two second time-frequency resource element groups in the second time-frequency resource element group set.

5. The data transmission method according to claim 1, wherein:

the size of the time-frequency resource element group is determined based on the transmission parameter, wherein the transmission parameter comprises at least one of a scheduling bandwidth, a delay spread, and a moving speed of a terminal device, and wherein the method further comprises:

before the performing, by the transmit end device, interleaving processing on the modulation symbol sequence, determining, by the transmit end device based on a preset correspondence between the transmission parameter and the size of the time-frequency resource element group, a size of the time-frequency resource element group that corresponds to a current transmission parameter.

6. The data transmission method according to claim 1, wherein the size of the time-frequency resource element group is determined based on the transmission parameter, wherein the transmission parameter comprises at least one of a scheduling bandwidth, a delay spread, or a moving speed of a terminal device,
wherein the transmit end device is a network device and a receive end device is the terminal device, and
wherein the method further comprises, before the performing, by the transmit end device, interleaving processing on the modulation symbol sequence:
determining, by the transmit end device, the size of the time-frequency resource element group based on the transmission parameter; and
sending, by the transmit end device, interleaving indication information to the receive end device, wherein the interleaving indication information indicates the size of the time-frequency resource element group.

7. The data transmission method according to claim 6, wherein:
the interleaving indication information is sent by using radio resource control (RRC) signaling, a media access control-control element (MAC-CE), or downlink control information (DCI).

8. The data transmission method according to claim 1, wherein:
the plurality of time-frequency resource element groups comprise two or more frequency domain resources on at least one orthogonal frequency division multiplexing (OFDM) symbol.

9. A receive end device, comprising:
a transceiver configured to receive modulation symbols transmitted by using a plurality of time-frequency resource element groups, wherein the modulation symbols are mapped onto the plurality of time-frequency resource element groups in an order obtained after interleaving processing is performed on a modulation symbol sequence by using a time-frequency resource element group of the plurality of time-frequency resource element groups as an interleaving unit, the time-frequency resource element group comprises N time-frequency resource elements, N is an integer greater than or equal to 2, one time-frequency resource element of the N time-frequency resource elements comprises at least one resource element (RE), the time-frequency resource element of the N time-frequency resource elements is used to carry one modulation symbol group, the one modulation symbol group comprises at least one modulation symbol, and a size of the time-frequency resource element group is agreed on in a protocol, or a size of the time-frequency resource element group is determined based on a transmission parameter; and
at least one processor coupled with a non-transitory computer-readable storage medium storing programming instructions for execution by the at least one processor, wherein the programming instructions instruct the at least one processor to perform, using the time-frequency resource element group as an interleaving unit, de-interleaving processing on the modulation symbols transmitted by using the plurality of time-frequency resource element groups, to obtain the modulation symbol sequence.

10. The receive end device according to claim 9, wherein:
the modulation symbol sequence comprises a modulation symbol of a data transport block and a modulation symbol of a reference signal comprised in a scheduling resource corresponding to the data transport block, and the time-frequency resource element group is a physical time-frequency resource element group.

11. The receive end device according to claim 9, wherein:
the modulation symbol sequence comprises only a modulation symbol of a data transport block, the time-frequency resource element group is a logical time-frequency resource element group, and the logical time-frequency resource element group comprises a time-frequency resource element that is of a physical time-frequency resource and that is configured to carry only the modulation symbol of the data transport block, and wherein the physical time-frequency resource comprises the time-frequency resource element used to carry the modulation symbol of the data transport block and a time-frequency resource element used to carry a modulation symbol of a reference signal comprised in a scheduling resource corresponding to the data transport block.

12. The receive end device according to claim 9, wherein:
the modulation symbol sequence comprises a first modulation symbol sequence and a second modulation symbol sequence, the plurality of time-frequency resource element groups comprise a first time-frequency resource element group set and a second time-frequency resource element group set, the first time-frequency resource element group set is used to carry the first modulation symbol sequence, the second time-frequency resource element group set is used to carry the second modulation symbol sequence, the first time-frequency resource element group set comprises at least two first time-frequency resource element groups, the first time-frequency resource element group comprises N1 first time-frequency resource elements, N1 is an integer greater than or equal to 2, the second time-frequency resource element group set comprises at least two second time-frequency resource element groups, the second time-frequency resource element group comprises N2 second time-frequency resource elements, N2 is an integer greater than or equal to 2, one first time-frequency resource element is used to carry one first modulation symbol group, and one second time-frequency resource element is used to carry one second modulation symbol group, wherein a quantity of resource elements (REs) comprised in the first time-frequency resource element is different from that of resource elements (REs) comprised in the second time-frequency resource element, and
wherein the programming instructions further instruct the at least one processor to:
perform interleaving processing on the first modulation symbol sequence using the first time-frequency resource element group as an interleaving unit to obtain a first order in which the first modulation symbol sequence is mapped onto the first time-frequency resource element group set; and
perform interleaving processing on the second modulation symbol sequence using the second time-frequency resource element group as an interleaving unit to obtain a second order in which the second modulation symbol sequence is mapped onto the second time-frequency resource element group set, wherein a plurality of consecutive first modulation symbol groups in the first modulation symbol sequence are mapped onto the at least two first time-frequency resource element groups in the first time-frequency resource element group set, and a plurality of consecutive second modulation symbol groups in the second modulation symbol sequence are mapped onto the at least two second time-frequency resource element groups in the second time-frequency resource element group set.

13. The receive end device according to claim 9, wherein:
the size of the time-frequency resource element group is determined based on the transmission parameter, wherein the transmission parameter comprises at least one of a scheduling bandwidth, a delay spread, and a moving speed of a terminal device, and
the programming instructions further instruct the at least one processor to:
before the performing, using the time-frequency resource element group as an interleaving unit, de-interleaving processing on the modulation symbols transmitted by using the plurality of time-frequency resource element groups, determine, based on a preset correspondence between the transmission parameter and the size of the time-frequency resource element group, a size of the time-frequency resource element group that corresponds to a current transmission parameter.

14. The receive end device according to claim 9, wherein the size of the time-frequency resource element group is determined based on the transmission parameter, wherein the transmission parameter comprises at least one of a scheduling bandwidth, a delay spread, or a moving speed of a terminal device,
wherein the receive end device is a network device and a transmit end device is the terminal device, and
wherein the programming instructions further instruct the at least one processor to, before the transceiver receives the modulation symbols transmitted by using the plurality of time-frequency resource element groups,
determine the size of the time-frequency resource element group based on the transmission parameter; and
cause the transceiver to send interleaving indication information to the transmit end device, wherein the interleaving indication information indicates the size of the time-frequency resource element group.

15. The receive end device according to claim 14, wherein:
the interleaving indication information is sent by using radio resource control (RRC) signaling, a media access control-control element (MAC-CE), or downlink control information (DCI).

16. The receive end device according to claim 9, wherein:
the plurality of time-frequency resource element groups comprise two or more frequency domain resources on at least one orthogonal frequency division multiplexing (OFDM) symbol.

17. A transmit end device, comprising:
a transceiver; and
at least one processor coupled with a non-transitory computer-readable storage medium storing programming instructions for execution by the at least one processor, wherein the programming instructions instruct the at least one processor to:
obtain a modulation symbol sequence in a plurality of time-frequency resource element groups, wherein the plurality of time-frequency resource element groups comprises N time-frequency resource elements, N is an integer greater than or equal to 2, one time-frequency resource element of the N time-frequency resource elements comprises at least one resource element RE, the time-frequency resource element of the N time-frequency resource elements is used to carry one modulation symbol group, the one modulation symbol group comprises at least one modulation symbol, and a size of a time-frequency resource element group of the plurality of time-frequency resource element groups is agreed on in a protocol, or a size of the time-frequency resource element group is determined based on a transmission parameter;
perform interleaving processing on the modulation symbol sequence using the time-frequency resource element group as an interleaving unit to obtain an order in which the modulation symbol sequence is mapped onto the plurality of time-frequency resource element groups, wherein a plurality of consecutive modulation symbol groups in the modulation symbol sequence are mapped onto at least two of the plurality of time-frequency resource element groups; and
cause the transceiver to send, to a receive end device, the modulation symbol sequence in the order in which the modulation symbol sequence is mapped onto the plurality of time-frequency resource element groups.

18. The transmit end device according to claim 17, wherein:
the modulation symbol sequence comprises a modulation symbol of a data transport block and a modulation symbol of a reference signal comprised in a scheduling resource corresponding to the data transport block, and the time-frequency resource element group is a physical time-frequency resource element group.

19. The transmit end device according to claim 17, wherein:
the modulation symbol sequence comprises only a modulation symbol of a data transport block, the time-frequency resource element group is a logical time-frequency resource element group, and the logical time-frequency resource element group comprises a time-frequency resource element that is of a physical time-frequency resource and that is configured to carry only the modulation symbol of the data transport block, and wherein the physical time-frequency resource comprises the time-frequency resource element used to carry the modulation symbol of the data transport block and a time-frequency resource element used to carry a modulation symbol of a reference signal comprised in a scheduling resource corresponding to the data transport block.

20. The transmit end device according to claim 17, wherein:
the modulation symbol sequence comprises a first modulation symbol sequence and a second modulation symbol sequence, the plurality of time-frequency resource element groups comprise a first time-frequency resource element group set and a second time-frequency resource element group set, the first time-frequency resource element group set is used to carry the first modulation symbol sequence, the second time-frequency resource element group set is used to carry the second modulation symbol sequence, the first time-frequency resource element group set comprises at least two first time-frequency resource element groups, the first time-frequency resource element group comprises N1 first time-frequency resource elements, N1 is an integer greater than or equal to 2, the second time-frequency resource element group set comprises at least two second time-frequency resource element groups, the second time-frequency resource element group comprises N2 second time-frequency resource elements, N2 is an integer greater than or equal to 2, one first time-frequency resource element is used to carry one first modulation symbol group, and one second time-frequency resource element is used to carry one second modulation symbol group, wherein a quantity of resource elements (REs) comprised in the first time-frequency resource element is different from that of resource elements (REs) comprised in the second time-frequency resource element, and wherein the programming instructions further instruct the at least one processor to:
perform interleaving processing on the first modulation symbol sequence using the first time-frequency resource element group as an interleaving unit to obtain a first order in which the first modulation symbol sequence is mapped onto the first time-frequency resource element group set; and perform interleaving processing on the second modulation symbol sequence using the second time-frequency resource element group as an interleaving unit to obtain a second order in which the second modulation symbol sequence is mapped onto the second time-frequency resource element group set, wherein a plurality of consecutive first modulation symbol groups in the first modulation symbol sequence are mapped onto the at least two first time-frequency resource element groups in the first time-frequency resource element group set, and a plurality of consecutive second modulation symbol groups in the second modulation symbol sequence are mapped onto the at least two second time-frequency resource element groups in the second time-frequency resource element group set.

* * * * *